(12) United States Patent
Rangan et al.

(10) Patent No.: US 7,752,361 B2
(45) Date of Patent: *Jul. 6, 2010

(54) APPARATUS AND METHOD FOR DATA MIGRATION IN A STORAGE PROCESSING DEVICE

(75) Inventors: Venkat Rangan, San Jose, CA (US); Edward D. McClanahan, Pleasanton, CA (US); Michael B. Schmitz, Oakland, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 225 days.

This patent is subject to a terminal disclaimer.

(21) Appl. No.: 10/695,408

(22) Filed: Oct. 28, 2003

(65) Prior Publication Data

US 2004/0139237 A1 Jul. 15, 2004

Related U.S. Application Data

(63) Continuation-in-part of application No. 10/610,304, filed on Jun. 30, 2003, now abandoned.

(60) Provisional application No. 60/393,017, filed on Jun. 28, 2002, provisional application No. 60/392,816, filed on Jun. 28, 2002, provisional application No. 60/392,873, filed on Jun. 28, 2002, provisional application No. 60/393,046, filed on Jun. 28, 2002, provisional application No. 60/392,408, filed on Jun. 28, 2002, provisional application No. 60/392,454, filed on Jun. 28, 2002, provisional application No. 60/393,000, filed on Jun. 28, 2002, provisional application No. 60/392,410, filed on Jun. 28, 2002, provisional application No. 60/392,398, filed on Jun. 28, 2002.

(51) Int. Cl.
*G06F 13/00* (2006.01)
*G06F 3/00* (2006.01)

(52) U.S. Cl. .................... 710/74; 711/100; 712/10
(58) Field of Classification Search .................. 710/74, 710/106, 316, 240; 709/217; 711/147
See application file for complete search history.

(56) References Cited

U.S. PATENT DOCUMENTS 6,880,102 B1 * 4/2005 Bridge ........................ 714/6

(Continued)

*Primary Examiner*—Tariq R. Hafiz
*Assistant Examiner*—Scott Sun
(74) *Attorney, Agent, or Firm*—Wong, Cabello, Lutsch, Rutherford & Brucculeri LLP

(57) ABSTRACT

A system including a storage processing device with an input/output module. The input/output module has port processors to receive and transmit network traffic. The input/output module also has a switch connecting the port processors. Each port processor categorizes the network traffic as fast path network traffic or control path network traffic. The switch routes fast path network traffic from an ingress port processor to a specified egress port processor. The storage processing device also includes a control module to process the control path network traffic received from the ingress port processor. The control module routes processed control path network traffic to the switch for routing to a defined egress port processor. The control module is connected to the input/output module. The input/output module and the control module are configured to interactively support data virtualization, data migration, data journaling, and snapshotting. The distributed control and fast path processors achieve scaling of storage network software. The storage processors provide line-speed processing of storage data using a rich set of storage-optimized hardware acceleration engines. The multi-protocol switching fabric provides a low-latency, protocol-neutral interconnect that integrally links all components with any-to-any non-blocking throughput.

36 Claims, 29 Drawing Sheets

U.S. PATENT DOCUMENTS

| | | | |
|---|---|---|---|
| 6,883,073 B2 * | 4/2005 | Arakawa et al. | 711/162 |
| 2002/0112113 A1 | 8/2002 | Karpoff et al. | 711/4 |
| 2003/0002503 A1 | 1/2003 | Brewer et al. | 370/392 |
| 2003/0005248 A1 | 1/2003 | Selkirk et al. | 711/165 |
| 2003/0037127 A1 | 2/2003 | Shah et al. | 709/220 |
| 2003/0061220 A1 | 3/2003 | Ibrahim et al. | 707/10 |
| 2003/0131182 A1 | 7/2003 | Kumar et al. | 711/5 |
| 2003/0140209 A1 | 7/2003 | Testardi | 711/203 |
| 2003/0140210 A1 * | 7/2003 | Testardi | 711/203 |
| 2003/0149848 A1 | 8/2003 | Ibrahim et al. | 711/154 |
| 2003/0172149 A1 * | 9/2003 | Edsall et al. | 709/224 |
| 2003/0221022 A1 * | 11/2003 | Sexton et al. | 709/321 |
| 2004/0133718 A1 * | 7/2004 | Kodama et al. | 710/74 |

* cited by examiner

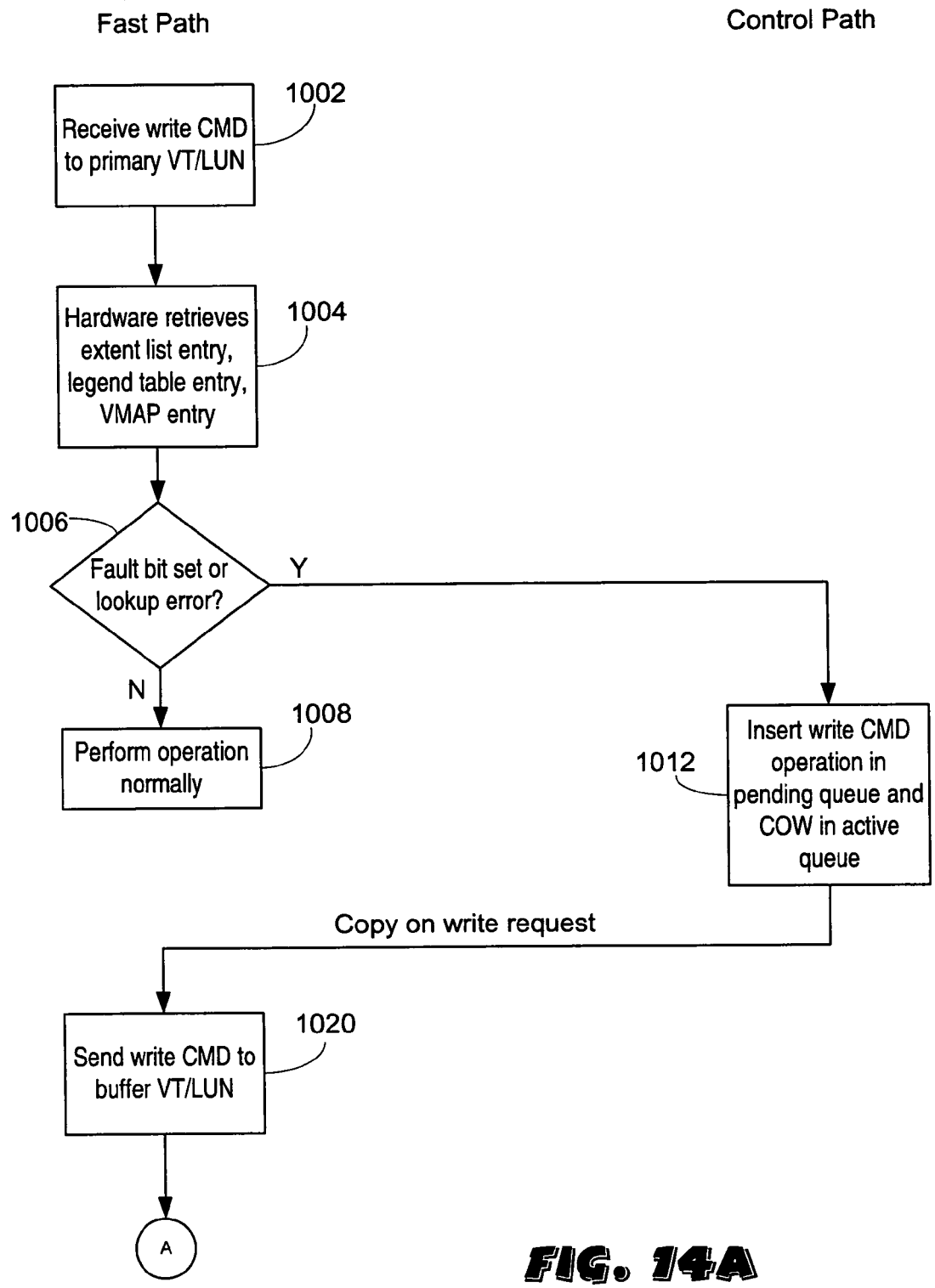

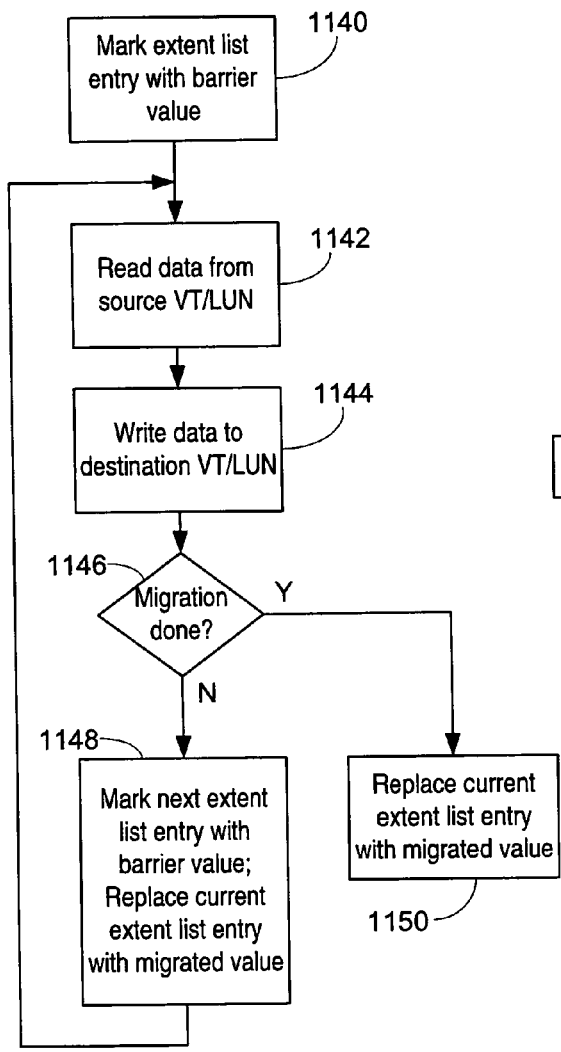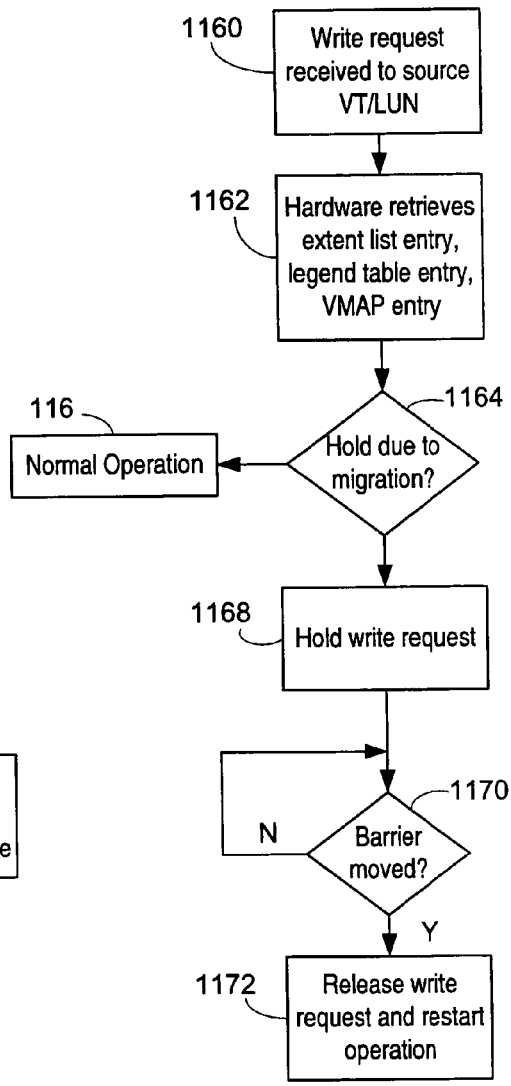
FIG. 20A
FIG. 20B

APPARATUS AND METHOD FOR DATA MIGRATION IN A STORAGE PROCESSING DEVICE

CROSS-REFERENCE TO RELATED APPLICATIONS

This application is a continuation-in-part of U.S. patent application Ser. No. 10/610,304, entitled "Storage Area Network" by Venkat Rangan, Anil Goyal, Curt Beckmann, Ed McClanahan, Guru Pangal, Michael Schmitz, and Vinodh Ravindran, filed on Jun. 30, 2003, now abandoned which application in turn claims the benefit under 35 U.S.C. §119(e) of U.S. Provisional Patent Application Ser. No. 60/393,017 entitled "Apparatus and Method for Storage Processing with Split Data and Control Paths" by Venkat Rangan, Ed McClanahan, Guru Pangal, filed Jun. 28, 2002; Ser. No. 60/392,816 entitled "Apparatus and Method for Storage Processing Through Scalable Port Processors" by Curt Beckmann, Ed McClanahan, Guru Pangal, filed Jun. 28, 2002; Ser. No. 60/392,873 entitled "Apparatus and Method for Fibre Channel Data Processing in a Storage Processing Device" by Curt Beckmann, Ed McClanahan filed Jun. 28, 2002; Ser. No. 60/392,398 entitled "Apparatus and Method for Internet Protocol Processing in a Storage Processing Device" by Venkat Rangan, Curt Beckmann, filed Jun. 28, 2002; Ser. No. 60/392,410 entitled "Apparatus and Method for Managing a Storage Processing Device" by Venkat Rangan, Curt Beckmann, Ed McClanahan, filed Jun. 28, 2002; Ser. No. 60/393,000 entitled "Apparatus and Method for Data Snapshot Processing in a Storage Processing Device" by Venkat Rangan, Anil Goyal, Ed McClanahan filed Jun. 28, 2002; Ser. No. 60/392,454 entitled "Apparatus and Method for Data Replication in a Storage Processing Device" by Venkat Rangan, Ed McClanahan, Michael Schmitz filed Jun. 28, 2002; Ser. No. 60/392,408 entitled "Apparatus and Method for Data Migration in a Storage Processing Device" by Venkat Rangan, Ed McClanahan, Michael Schmitz filed Jun. 28, 2002; Ser. No. 60/393,046 entitled "Apparatus and Method for Data Virtualization in a Storage Processing Device" by Guru Pangal, Michael Schmitz, Vinodh Ravindran and Ed McClanahan filed Jun. 28, 2002, all of which applications are hereby incorporated by reference.

This application is also related to U.S. patent application Ser. No. 10/209,743, entitled "Method And Apparatus For Virtualizing Storage Devices Inside A Storage Area Network Fabric," by Naveen S. Maveli, Richard A. Walter, Cirillo Lino Costantino, Subhojit Roy, Carlos Alonso, Michael Yiu-Wing Pong, Shahe H. Krakirian, Subbarao Arumilli, Vincent Isip, Daniel Ji Yong Park, and Stephen D. Elstad; Ser. No. 10/209,742 entitled "Host Bus Adaptor-Based Virtualization Switch" by Subhojit Roy, Richard A. Walter, Cirillo Lino Costantino, Naveen S. Maveli, Carlos Alonso, and Michael Yiu-Wing Pong; and Ser. No. 10/209,694 entitled "Hardware-Based Translating Virtualization Switch" by Shahe H. Krakirian, Richard A. Walter, Subbarao Arumilli, Cirillo Lino Costantino, L. Vincent M. Isip, Subhojit Roy, Naveen S. Maveli, Daniel Ji Yong Park, Stephen D. Elstad, Dennis H. Makishima, and Daniel Y. Chung, all filed on Jul. 31, 2002, which are hereby incorporated by reference.

This application is also related to U.S. patent application Ser. Nos. 10/695,625, entitled "Apparatus and Method for Storage Processing with Split Data and Control Paths," by Venkat Rangan, Ed McClanahan, Guru Pangal, and Curt Beckmann; 10/695,407, entitled "Apparatus and Method for Storage Processing Through Scalable Port Processors" by Curt Beckmann, Ed McClanahan, and Guru Pangal; 10/695,628, entitled "Apparatus and Method for Fibre Channel Data Processing in a Storage Process Device," by Curt Beckmann and Ed McClanahan; 10/695,626, Entitled "Apparatus and Method for Internet Protocol Data Processing in a Storage Processing Device," by Venkat Rangan and Curt Beckmann; 10/703,171, entitled "Apparatus and Method for Data Snapshot Processing in a Storage Processing Device," by Venkat Rangan, Anil Goyal, and Ed McClanahan; 10/695,434, entitled "Apparatus and Method for Data Replication in a Storage Processing Device," by Venkat Rangan, Ed McClanahan, and Michael Schmitz; 10/695,435, entitled "Apparatus and Method for Data Virtualization in a Storage Processing Device," by Guru Pangal, Michael Schmitz, Vinodh Ravindran, and Ed McClanahan; and 10/695,422, entitled "Apparatus and Method for Mirroring in a Storage Processing Device," by Vinodh Ravindran, Ed McClanahan, and Venkat Rangan, all filed concurrently herewith and hereby incorporated by reference.

BRIEF DESCRIPTION OF THE INVENTION

This invention relates generally to the storage of data. More particularly, this invention relates to a storage application platform for use in storage area networks.

BACKGROUND OF THE INVENTION

The amount of data in data networks continues to grow at an unwieldy rate. This data growth is producing complex storage-management issues that need to be addressed with special purpose hardware and software.

Data storage can be broken into two general approaches: direct-attached storage (DAS) and pooled storage. Direct-attached storage utilizes a storage source on a tightly coupled system bus. Pooled storage includes network-attached storage (NAS) and storage area networks (SANs). A NAS product is typically a network file server that provides pre-configured disk capacity along with integrated systems and storage management software. The NAS approach addresses the need for file sharing among users of a network (e.g., Ethernet) infrastructure.

The SAN approach differs from NAS in that it is based on the ability to directly address storage in low-level blocks of data. SAN technology has historically been associated with the Fibre Channel technology. Fibre Channel technology blends gigabit-networking technology with I/O channel technology in a single integrated technology family. Fibre Channel is designed to run on fiber optic and copper cabling. SAN technology is optimized for I/O intensive applications, while NAS is optimized for applications that require file serving and file sharing at potentially lower I/O rates.

In view of these different approaches, a new network storage solution, Internet Small Computer System Interface (iSCSI), has been introduced. ISCSI features the same Internet Protocol infrastructure as NAS, but features the block I/O protocol inherent in SANs. ISCSI technology facilitates the deployment of storage area networking over an Internet Protocol (IP) network, rather than a Fibre Channel based SAN.

ISCSI is an open standard approach in which SCSI information is encapsulated for transport over IP networks. The storage is attached to a TCP/IP network, but is accessed by the same I/O commands as DAS and SAN storage, rather than the specialized file-access protocols of NAS and NAS gateways.

An emerging architecture for deploying storage applications moves storage resource and data management software functionality directly into the SAN, allowing a single or few application instances to span an unbounded mix of SAN-connected host and storage systems. This consolidated deployment model reduces management costs and extends application functionality and flexibility. Existing approaches for deploying application functionality within a storage network present various technical tradeoffs and cost-of-ownership issues, and have had limited success.

In-band appliances using standard compute platforms do not scale effectively, as they require a general-purpose processor/memory complex to process every storage data stream "in-band". Common scaling limits include various I/O and memory buses limited to low Gb/sec data streams and contention for centralized processor and memory systems that are inefficient at data movement and transport operations.

Out-of-band appliances or array controllers distribute basic storage virtualization functions to agent software on custom host bus adapters (HBAs) or host OS drivers in order to avoid a single data path bottleneck. However, high value functions, such as multi-host storage volume sharing, data journaling, and migration must be performed on an off-host appliance platform with similar limitations as in-band appliances. In addition, the installation and maintenance of custom drivers or HBAs on every host introduces a new layer of host management and performance impact.

In view of the foregoing, it would be highly desirable to provide a storage application platform to facilitate increased management and resource efficiency for larger numbers of servers and storage systems. The storage application platform should provide increased site-wide data journaling and movement across a hierarchy of storage systems that enable significant improvements in data protection, information management, and disaster recovery. The storage application platform would, ideally, also provide linear scalability for simple and complex processing of storage I/O operations, and compact and cost-effective deployment footprints, line-rate data processing with the throughput and latency required to avoid incremental performance or administrative impact to existing hosts and data storage systems. In addition, the storage application should provide transport-neutrality across Fibre Channel, IP, and other protocols, while providing investment protection via interoperability with existing equipment.

SUMMARY OF THE INVENTION

Systems according to the invention include a storage processing device with an input/output module. The input/output module has port processors at each port to receive and transmit network traffic. The input/output module also has a switch connecting the port processors. Each port processor categorizes the network traffic as fast path network traffic or control path network traffic. The switch routes fast path network traffic from an ingress port to a specified egress port. The fast path network traffic may be processed by application intelligence at either or both of the ingress or egress ports or neither port in some cases. The storage processing device also includes a control module to process the control path network traffic received from the ingress port via an ingress port processor. The control module routes processed control path network traffic to the switch for routing to a defined egress port. The control module is connected to the input/output module. The input/output module and the control module are configured to interactively support data virtualization, data migration, journaling, mirroring, snapshotting and protocol conversion.

Advantageously, the invention provides performance, scalability, flexibility and management efficiency. The distributed control and fast path processors of the invention achieve scaling of storage network software. The storage processors of the invention provide line-speed processing of storage data using a rich set of storage-optimized hardware acceleration engines. The multi-protocol switching fabric utilized in accordance with an embodiment of the invention provides a low-latency, transport-neutral interconnect that integrally links all components with any-to-any non-blocking throughput.

BRIEF DESCRIPTION OF THE FIGURES

The invention is more fully appreciated in connection with the following detailed description taken in conjunction with the accompanying drawings, in which:

FIGS. 14A and 14B are flowchart illustrations of a snapshot operation in accordance with an embodiment of the invention

FIGS. 20A and 20B are flowchart illustrations of a migration operation in accordance with an embodiment of the invention.

DETAILED DESCRIPTION OF THE INVENTION

Figure 1A:
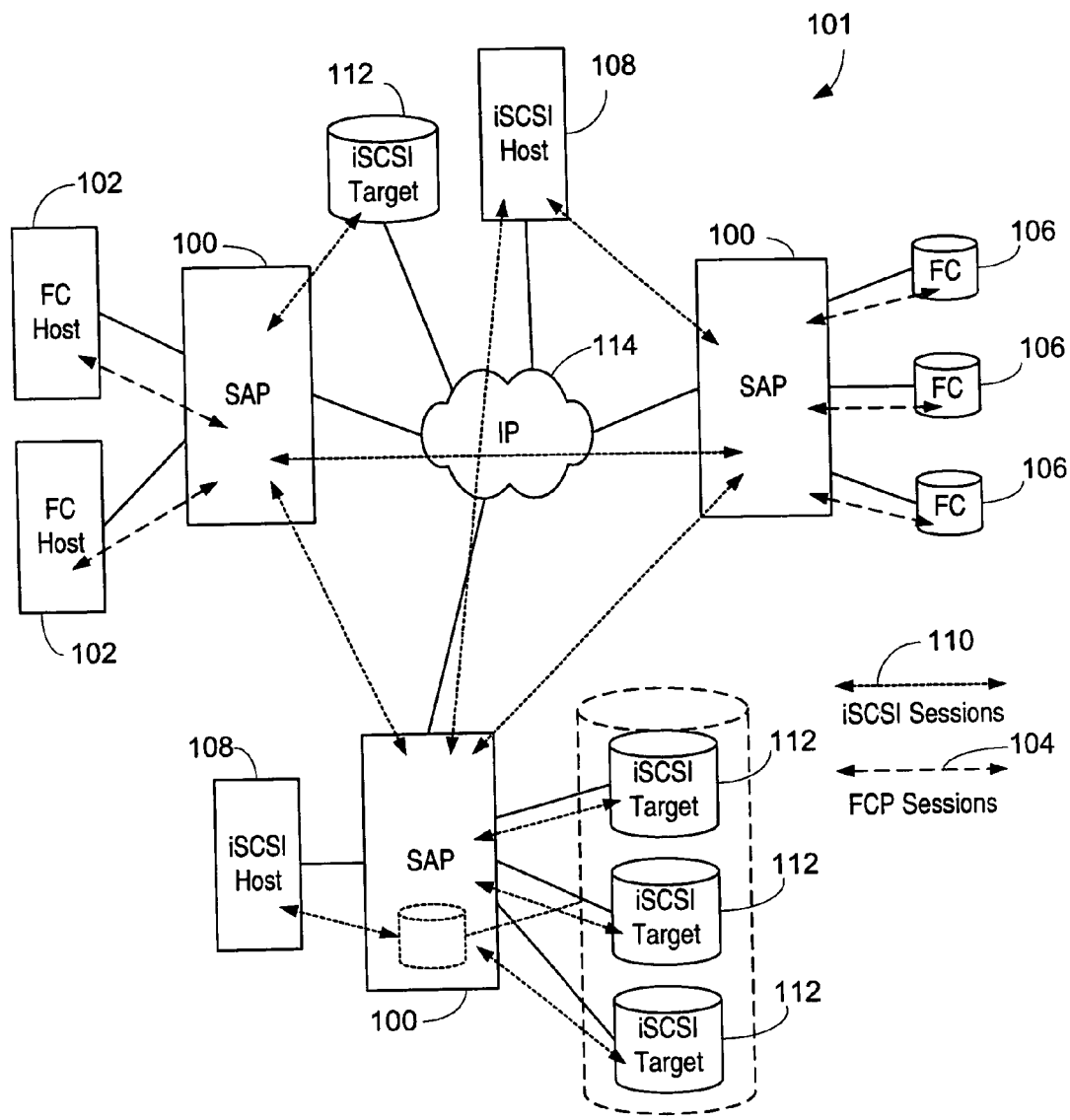
FIGS. 1A and 1B illustrate networked environments incorporating the storage application platforms of the invention.
Figure 1B:
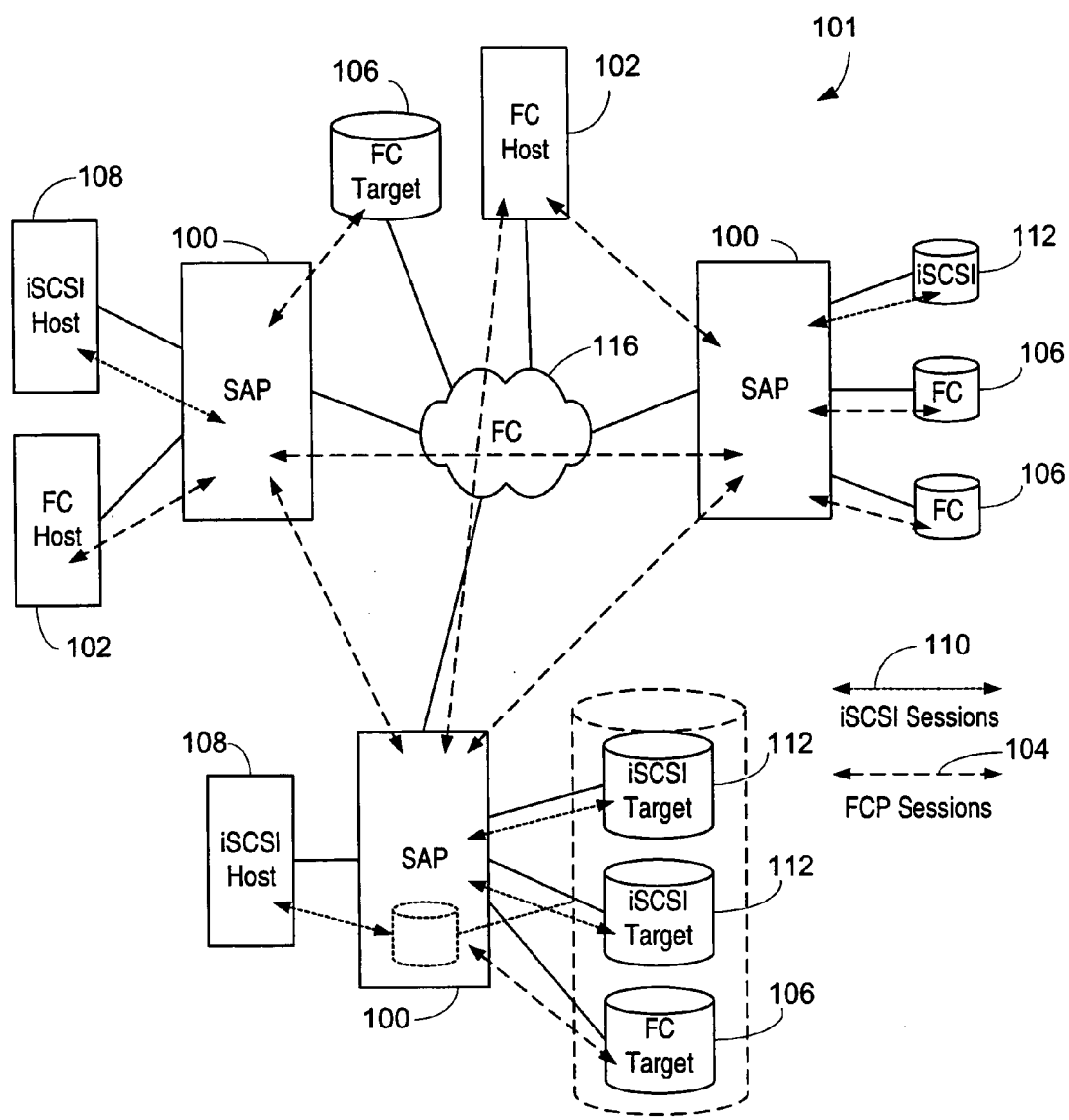

The invention is directed toward a storage application platform and various methods of operating the storage application platform. FIGS. 1A and 1B illustrate various instances of a storage application platform 100 according to the invention positioned within a network 101. The network 101 includes various instances of a Fibre Channel host 102. Fibre Channel protocol sessions between the storage application platform and the Fibre Channel host, as represented by arrow 104, are supported in accordance with the invention. Fibre Channel protocol sessions 104 are also supported between Fibre Channel storage devices or targets 106 and the storage application platform 100.

The network 101 also includes various instances of an iSCSI host 108. ISCSI sessions, as shown with arrow 110, are supported between the iSCSI hosts 108 and the storage application platforms 100. Each storage application platform 100 also supports iSCSI sessions 110 with iSCSI targets 112. As shown in FIG. 1A, the iSCSI sessions 110 cross other portions of an Internet Protocol (IP) network or fabric 114, the other portions of the network 114 being formed by a series of IP switches. As shown in FIG. 1B, the FCP sessions 104 cross a Fibre Channel (FC) fabric 116, the other portions of the fabric 116 being formed by a series of FC switches.

The storage application platform 100 of the invention provides a gateway between iSCSI and the Fibre Channel Protocol (FCP). That is, the storage application platform 100 provides seamless communications between iSCSI hosts 102 and FCP targets 106, FCP initiators 102 and iSCSI targets 112, and FCP initiators 102 to remote FCP targets 106 across IP networks 114. Combining the iSCSI protocol stack with the Fibre Channel protocol stack and translating between the two achieves iSCSI-FC gateway functionality in accordance with the invention.

In some situations, for example sessions with multiple switch hops, iSCSI session traffic will not terminate at the storage application platform 100, but will only pass through on its way to the final destination. The storage application platform 100 supports IP forwarding in this case, simply switching the traffic from an ingress port to an egress port based on its destination address.

The storage application platform 100 supports any combination of iSCSI initiator, iSCSI target, Fibre Channel initiator and Fibre Channel target interactions. Virtualized volumes include both iSCSI and Fibre Channel targets. Additionally, the storage application platforms 100 may also communicate through a Fibre Channel fabric, with FC hosts 102 and FC targets 106 connected to the fabric and iSCSI hosts 108 and iSCSI targets 112 connected to the storage application platforms 100 for gateway operations. Further, the storage application platforms 100 could be connected by both an IP network 114 and a Fibre Channel fabric 116, with hosts and targets connected as appropriate and the storage application platforms 100 acting as needed as gateways. Additionally, while the storage application platforms 100 are shown at the edge of the fabric 116 or network 114, they could be located in non-edge locations if desired.

In accordance with the invention, FCP, IP, iSCSI, and iSCSI-FCP processing in the storage application platform 100 is divided into fast path and control path processing. In this document, the fast path processing is sometimes referred to as XPath™ processing and the control path processing is sometimes referred to as control path processing. The bulk of the processed traffic is expedited through the fast path, resulting in large performance gains. Selective operations are processed through the control path when their performance is less critical to overall system performance.

Figure 2:
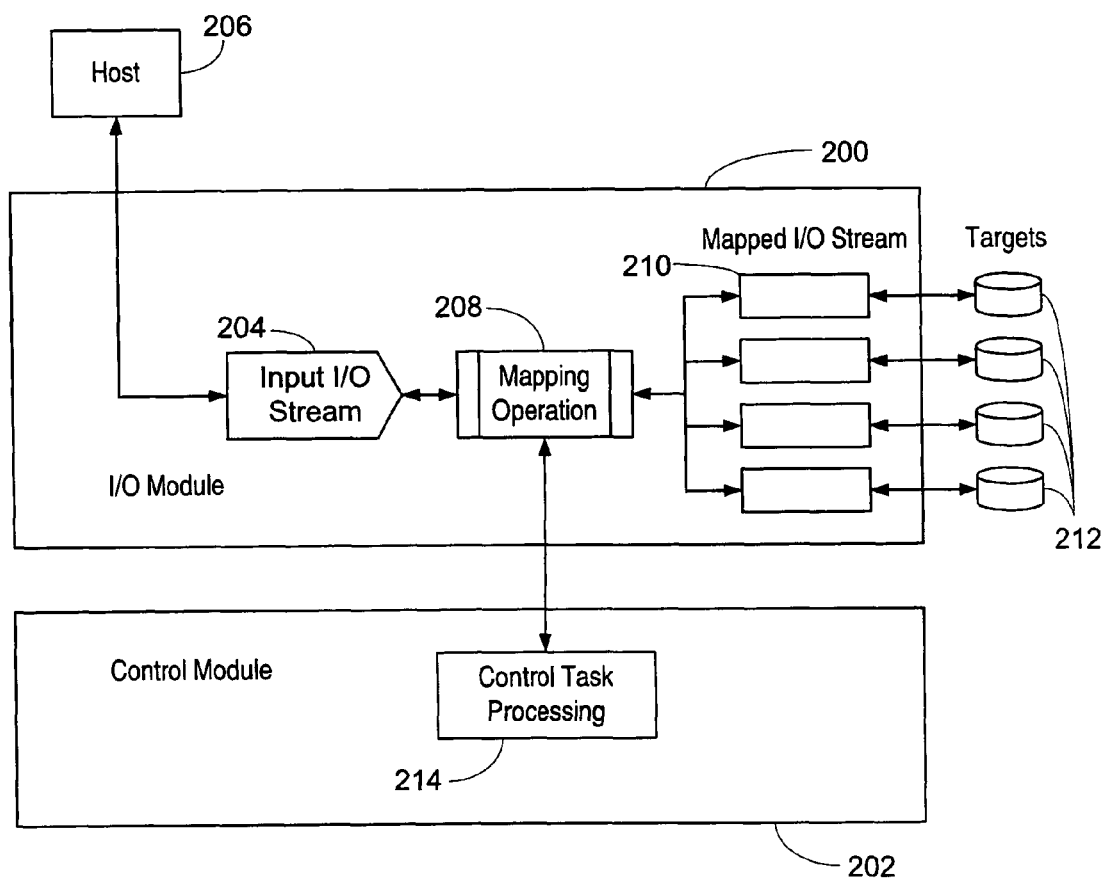
FIG. 2 illustrates an input/output (I/O) module and a control module utilized to perform processing in accordance with an embodiment of the invention.

FIG. 2 illustrates an input/output (I/O) module 200 and a control module 202 to implement fast path and control path processing, respectively. In one direction of processing, an I/O stream 204 is received from a host 206. A mapping operation 208 is used to divide the I/O stream between fast path and control path processing. For example, in the event of a SCSI input stream the following standards defined operations would be deemed fast path operations: Read(6), Read(10), Read(12), Write(6), Write(10), and Write(12). IP forwarding for known routes is another example of a fast path operation. As will be discussed further below, fast path processing is executed on the port processors according to the invention. In the event of a fast path operation, traffic is passed from an ingress port processor to an egress port processor via a crossbar. After routing by a crossbar (not shown in FIG. 2), the fast path traffic is directed as mapped input/output streams 210 to targets 212.

The mapping operation sends control traffic to the control module 202. Control path functions, such as iSCSI and Fibre Channel login and logout and routing protocol updates are forwarded for control task processing 214 within the control module 202.

Split control and fast path processing exploits the general nature of networked storage applications to greatly increase their scalability and performance. Control path components handle configuration, control, and management plane activities. Fast path processing components handle the delivery, transformation, and movement of data through SAN elements.

This split processing isolates the most frequent and performance sensitive functions and physically distributes them to a set of replicated, hardware-assisted fast path processors, leaving more complex configuration coordination functions to a smaller number of centralized control processors. Control path operations have low frequency and performance sensitivity, while having generally high functional complexity.

Figure 3:
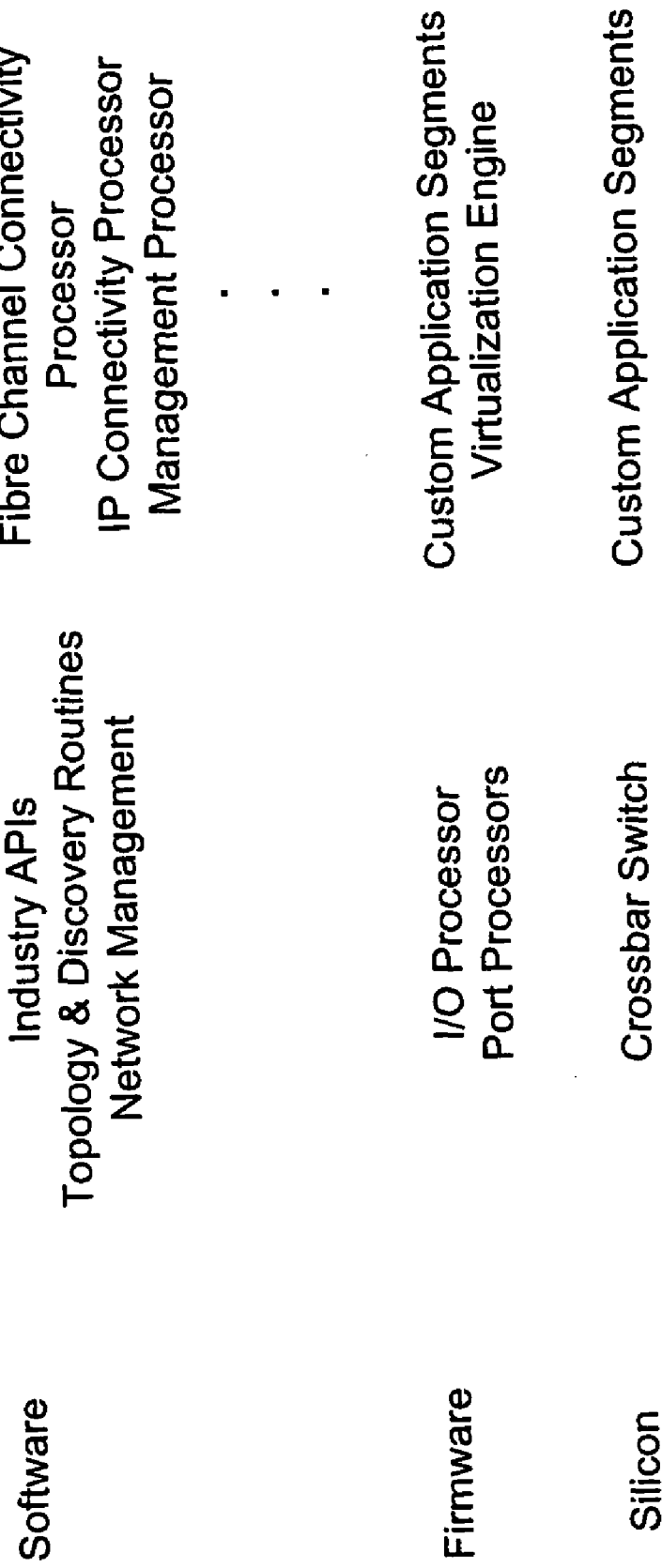
FIG. 3 illustrates a hierarchy of software, firmware, and semiconductor hardware utilized to implement various functions of the invention.

Fast path and control path operations are implemented through a hierarchy of software, firmware, and physical circuits. FIG. 3 illustrates how different functions are mapped in a processing hierarchy. Certain high level standards-based functions, such as application program interfaces, topology and discovery routines, and network management are implemented in software. Various custom applications can also be implemented in software, such as a Fibre Channel connectivity processor, an IP connectivity processor, and a management processor, which are discussed below.

Various functions are preferably implemented in firmware, such as the I/O processor and port processors according to the invention, which are described in detail below. Custom application segments and a virtualization engine are also implemented in firmware. Other functions, such as the crossbar switch and custom application segments, are implemented in silicon or some other semiconductor medium for maximum speed.

Figure 4:
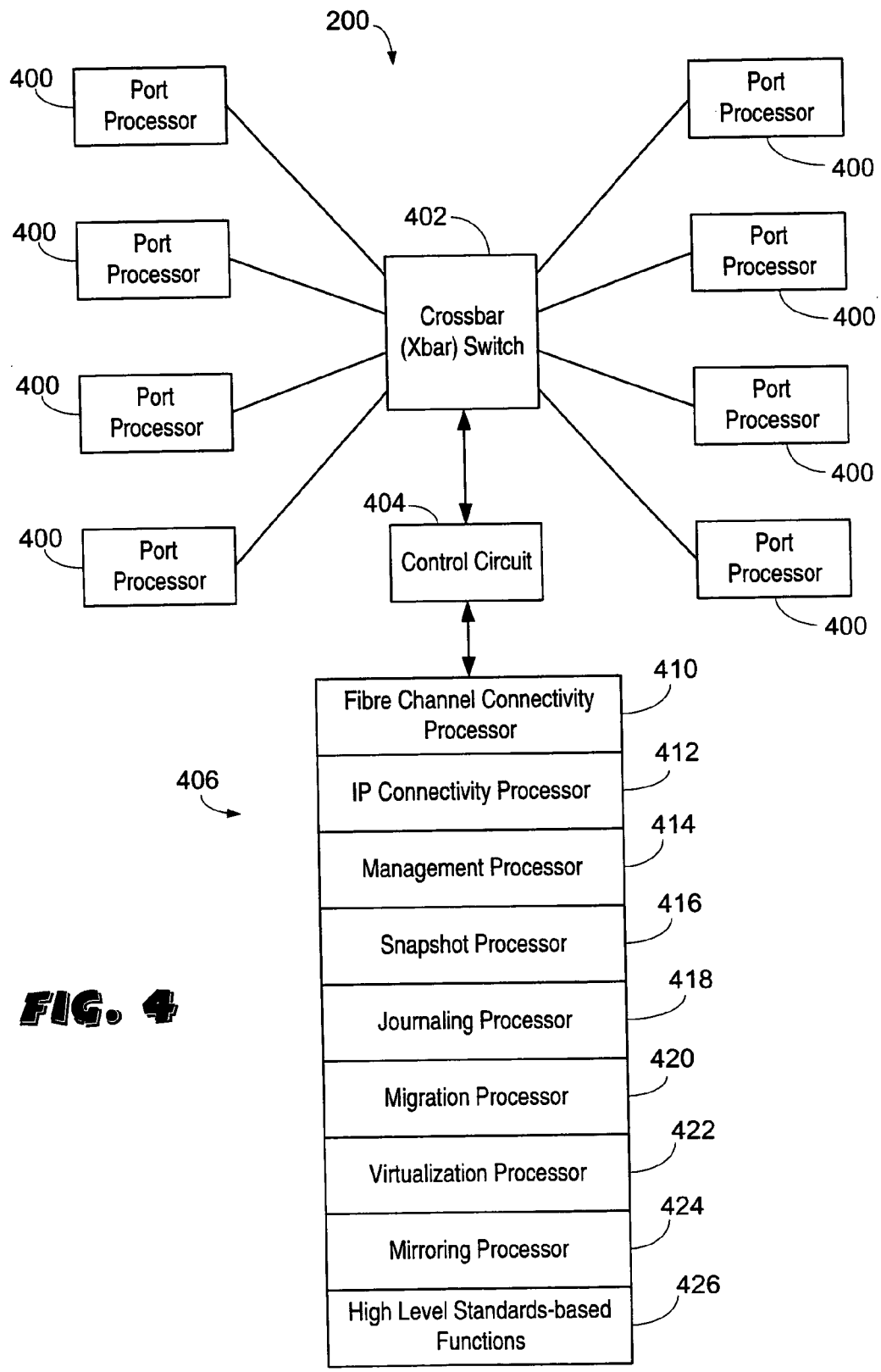
FIG. 4 illustrates an I/O module configured in accordance with an embodiment of the invention.

Many of the functions performed by the storage application platform of the invention are distributed across the I/O module 200 and the control module 202. FIG. 4 illustrates an embodiment of the I/O module 200. The I/O module 200 includes a set of port processors 400. Each port processor 400 can operate as both an ingress port and an egress port. A crossbar switch 402 links the port processors 400. A control circuit 404 also connects to the crossbar switch 402 to both control the crossbar switch 402 and provide a link to the port processors 400 for control path operations. The control circuit 404 may be a microprocessor, a dedicated processor, an Application Specific Integrated Circuit (ASIC), a Programmable Logic Device, or combinations thereof. The control circuit 404 is also attached to a memory 406, which stores a set of executable programs.

In particular, the memory 406 stores a Fibre Channel connectivity processor 410, an IP connectivity processor 412, and a management processor 414. The memory 406 also stores a snapshot processor 416, a journaling processor 418, a migration processor 420, a virtualization processor 422, and a mirroring processor 424. Each of these processors is discussed below. The memory 406 may also store a set of applications for high level standards-based functions 426.

The executable programs shown in FIG. 4 are disclosed in this manner for the purpose of simplification. As will be discussed below, the functions associated with these executable programs may also be implemented in silicon and/or firmware. In addition, as will be discussed below, the functions associated with these executable programs are partially performed on the port processors 400.

Figure 5:
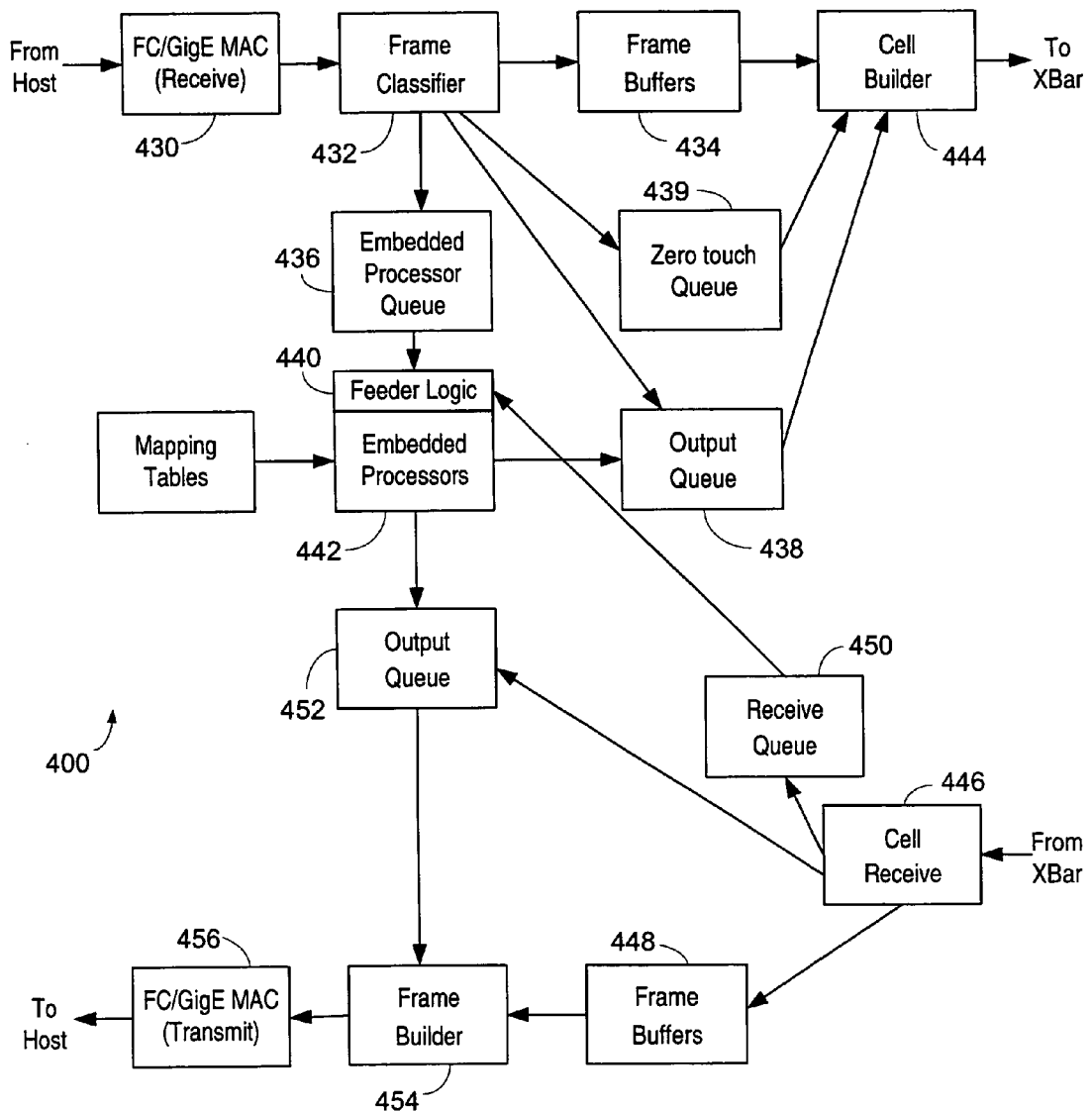
FIG. 5 illustrates an embodiment of a port processor utilized in connection with the I/O module of the invention.

FIG. 5 is a simplified illustration of a port processor 400. Each port processor 400 includes Fibre Channel and Gigabit Ethernet receive nodes 430 to receive either Fibre Channel or IP traffic. The use of Fibre Channel or Ethernet is software selectable for each port processor. The receive node 430 is connected to a frame classifier 432. The frame classifier 432 provides the entire frame to frame buffers 434, preferably DRAM, along with a message header specifying internal information such as destination port processor and a particular queue in that destination port processor. This information is developed by a series of lookups performed by the frame classifier 432.

Different operations are performed for IP frames and Fibre Channel frames. For Fibre Channel frames the SID and DID values in the frame header are used to determine the destination port, any zoning information, a code and a lookup address. The F_CTL, R_CTL, OXID and RXID values, FCP_CMD value and certain other values in the frame are used to determine a protocol code. This protocol code and the DID-based lookup address are used to determine initial values for the local and destination queues and whether the frame is to be processed by the control module, an ingress port, an egress port or none. The SID and DID-based codes are used to determine if the initial values are to be overridden, if the frame is to be dropped for an access violation, if further checking is needed or if the frame is allowed to proceed. If the frame is allowed, then the control module, ingress, egress or no port processing result is used to place the frame location information or value in the embedded processor queue 436 for ingress cases, an output queue 438 for egress and control module cases or a zero touch queue 439 for no processing cases. Generally control frames would be sent to the output queue 438 with a destination port specifying the control circuit 404 or would be initially processed at the ingress port. Fast path operations could use any of the three queues, depending on the particular frame.

IP frames are handled in a somewhat similar fashion, except that there are no zero touch cases. Information in the IP and iSCSI frame headers is used to drive combinatorial logic to provide coarse frame type and subtype values. These type and subtype values are used in a table to determine initial values for local and destination queues. The destination IP address is then used in a table search to determine if the destination address is known. If so, the relevant table entry provides local and destination queue values to replace the initial values and provides the destination port value. If the address is not known, the initial values are used and the destination port value must be determined. The frame location information is then placed in either the output queue 438 or embedded processor queue 436, as appropriate.

Frame information in the embedded processor queue 436 is retrieved by feeder logic 440 which performs certain operations such as DMA transfer of relevant message and frame information from the frame buffers 434 to the embedded processors 442. This improves the operation of the embedded processors 442. The embedded processors 442 include firmware, which has functions to correspond to some of the executable programs illustrated in memory 406 of FIG. 4. In the preferred embodiment, three embedded processors are provided but a different number of embedded processors could be utilized depending on processor capabilities, firmware complexity, overall throughput needed and the number of available gates. In various embodiments this includes firmware for determining and re-initiating SCSI I/Os; implementing data movement from one target to another; managing multiple, simultaneous I/O streams; maintaining data integrity and consistency by acting as a gate keeper when multiple I/O streams compete to access the same storage blocks; and handling updates to configurations while maintaining data consistency of the in-progress operations.

When the embedded processor 442 has completed ingress operations, the frame location value is placed in the output queue 438. A cell builder 444 gathers frame location values from the zero touch queue 439 and output queue 438. The cell builder 444 then retrieves the message and frame from the frame buffers 434. The cell builder 444 then sends the message and frame to the crossbar 402 for routing based on the destination port value provided in the message.

When a message and frame are received from the crossbar 402, they are provided to a cell receive module 446. The cell receive module 446 provides the message and frame to frame buffers 448 and the frame location values to either a receive queue 450 or an output queue 452. Egress port processing cases go to the receive queue 450 for retrieval by the feeder logic 440 and embedded processor 442. Cases where no egress port processing is required go directly to the output queue 452. After the embedded processor 442 has finished processing the frame, the frame location value is provided to the output queue 452. A frame builder 454 retrieves frame location values from the output queue 452 and changes any frame header information based on table entry values provided by an embedded processor 442. The message header is removed and the frame is sent to Fibre Channel and Gigabit Ethernet transmit nodes 456, with the frame then leaving the port processor 400.

In certain cases, particularly when a given port is operating in N-port mode, the embedded processors 442 may also receive frames from the embedded processor queue 436 and provide them to the output queue 438. Thus, the frames would enter and leave through the same port without traversing the crossbar switch 402.

While the majority of frame classification is done by the frame classifier 432, in certain circumstances, primarily when a protocol conversion is required, such as between FC and IP or FCP and iSCSI, the cell receive module 446 can override queue values provided by the frame classifier 432. This is preferably determined in the port requiring the conversion so that all of the other ports need not be further complicated by this conversion case.

Figure 6:
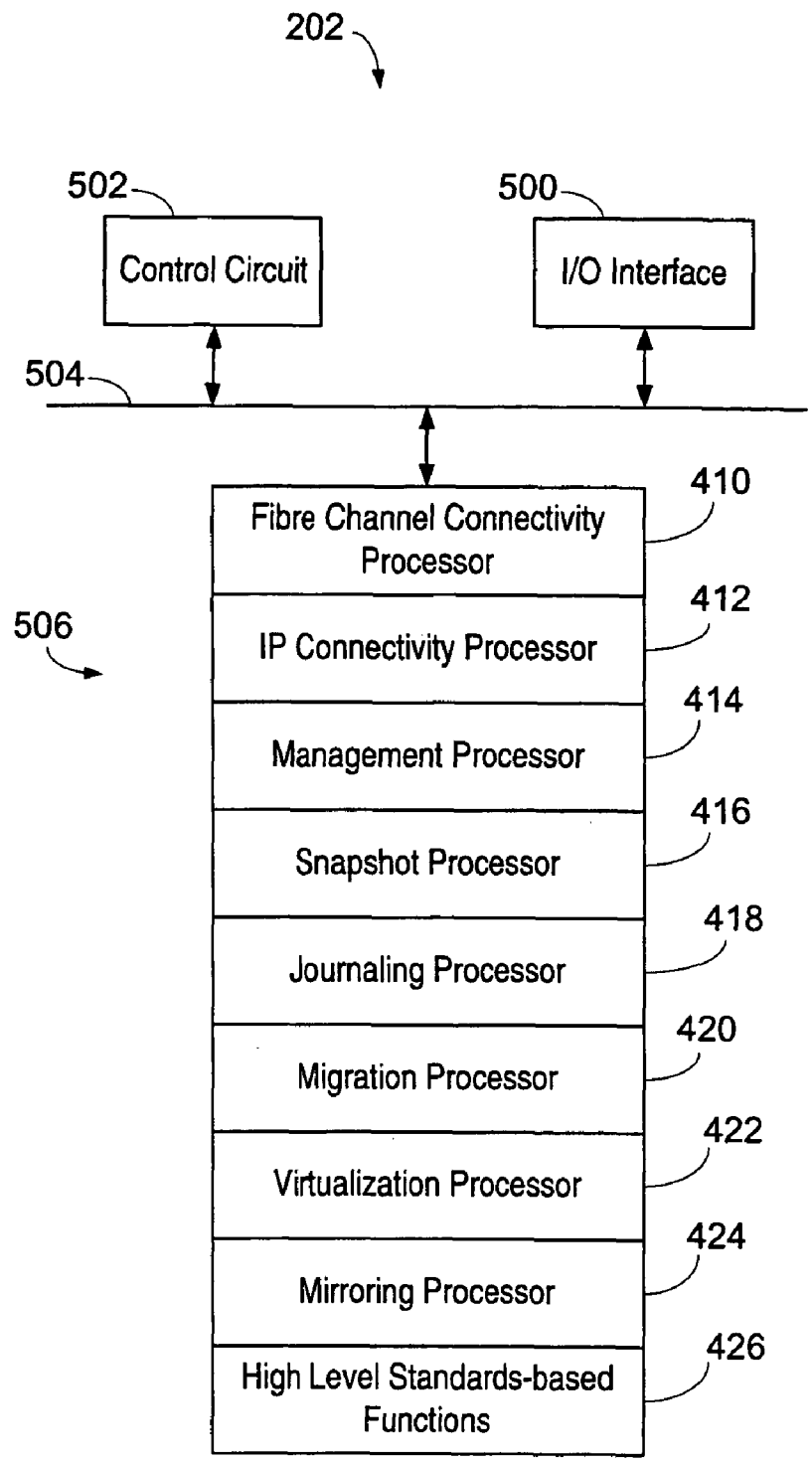
FIG. 6 illustrates a control module configured in accordance with an embodiment of the invention.

The embedded processors 442 thus include both ingress and egress operations. In the preferred embodiment, multiple embedded processors 442 perform ingress operations, preferably different operations, and at least one embedded processor 442 performs egress operations. The selection of the particular operations performed by a particular embedded processor 442 can be selected using device options and the frame classifier 432 will properly place frames in the embedded processor queue 436 and receive queue 450 to direct frames related to each operation to the appropriate embedded processor 442. In other variations multiple embedded processors 442 will process similar operations, depending on the particular configuration FIG. 6 illustrates an embodiment of the control module 202. The control module 202 includes an input/output interface 500 for exchanging data with the input/output module 200. A control circuit 502 (e.g., a microprocessor, a dedicated processor, an Application Specific Integrated Circuit (ASIC), a Programmable Logic Device, or combinations thereof) communicates with the I/O interface 500 via a bus 504. Also connected to the bus 504 is a memory 506. The memory stores control module portions of the executable programs described in connection with FIG. 4. In particular, the memory 506 stores: a Fibre Channel connectivity processor 410, an IP connectivity processor 412, a management processor 414, a snapshot processor 416, a journaling processor 418, a migration processor 420, a virtualization processor 422, and a mirroring processor 424. In addition to these custom applications, applications handling high level standards-based functions 426 may also be stored in memory 506. The executable programs of FIG. 6 are presented for the purpose of simplification. It should be appreciated that the functions implemented by the executable programs may be realized in silicon and/or firmware.

Figure 7:
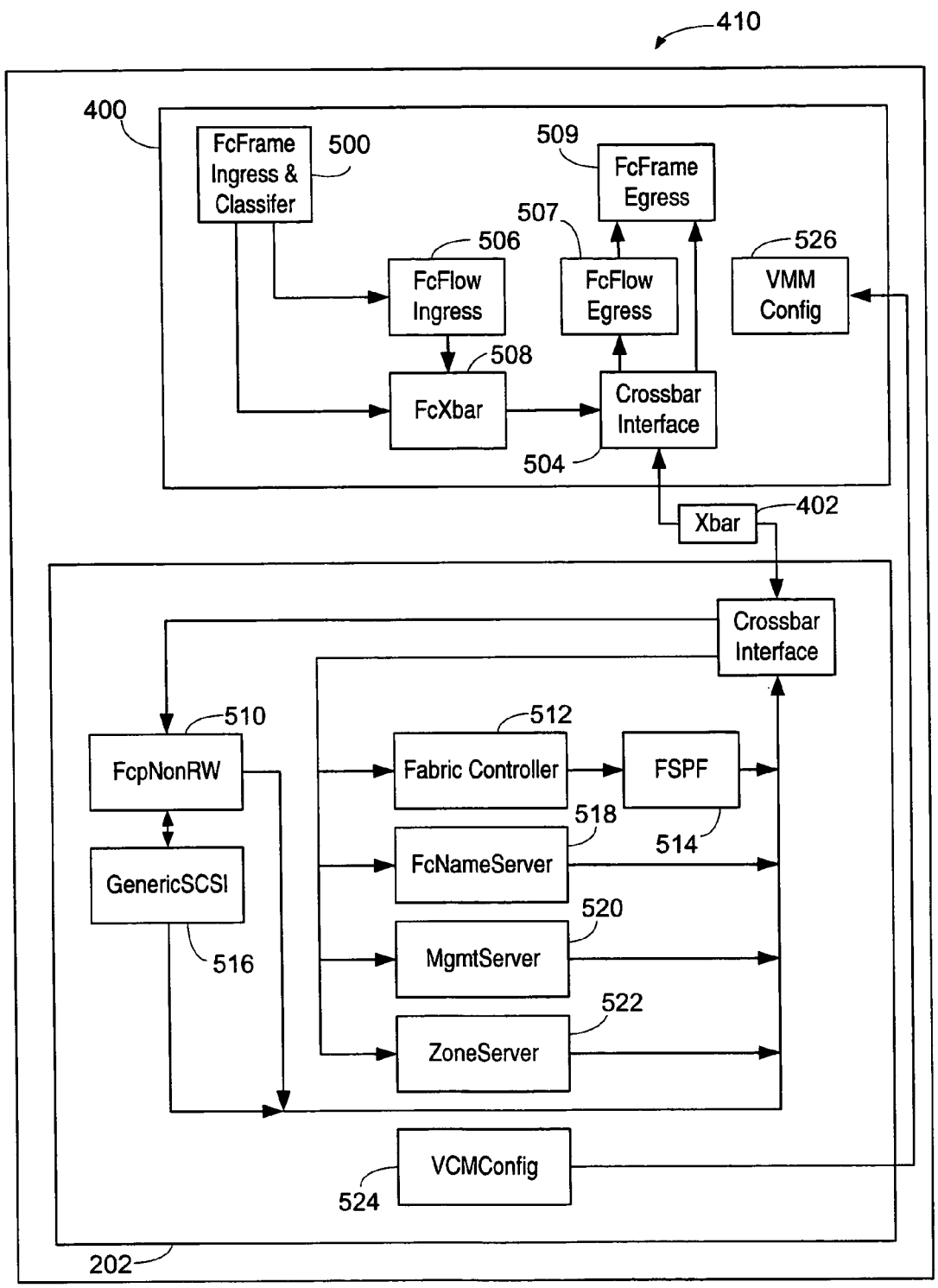
FIG. 7 illustrates a Fibre Channel connectivity module configured in accordance with an embodiment of the invention.

As previously indicated, various functions associated with the invention are distributed between the input/output module 200 and the control module 202. Within the input/output module 200, each port processor 400 implements many of the required functions. This distributed architecture is more fully appreciated with reference to FIG. 7. FIG. 7 illustrates the implementation of the Fibre Channel connectivity processor 410. As shown in FIG. 7, the control module 202 implements various functions of the Fibre Channel connectivity processor 410 along with the port processor 400.

In one embodiment according to the invention, the Fibre Channel connectivity processor 410 conforms to the following standards: FC-SW-2 fabric interconnect standards, FC-GS-3 Fibre Channel generic services, and FC-PH (now FC-FS and FC-PI) Fibre Channel FC-0 and FC-1 layers. Fibre Channel connectivity is provided to devices using the following: (1) F_Port for direct attachment of N_port capable hosts and targets, (2) FL_Port for public loop device attachments, and (3) E_Port for switch-to-switch interconnections.

In order to implement these connectivity options, the apparatus implements a distributed processing architecture using several software tasks and execution threads. FIG. 7 illustrates tasks and threads deployed on the control module and port processors. The data flow shows a general flow of messages.

An FcFrameIngress task 500 is a thread that is deployed on a port processor 400 and is in the datapath, i.e., it is in the path of both control and data frames. Because it is in the datapath, this task is engineered for very high performance. It is a combination of port processor core, feeder queue (with automatic lookups), and hardware-specific buffer queues. It corresponds in function to a port driver in a traditional operating system. Its functions include: (1) serialize the incoming fiber channel frames on the port, (2) perform any hardware-assisted auto-lookups, particularly including frame classification and (3) queue the incoming frame.

Most frames received by the FcFrameIngress task 500 are placed in the embedded processor queue 436 for the FcFlowIngress task 506. However, if a frame qualifies for "zero-touch" option, that frame is placed on the zero touch queue 439 for the crossbar interface 504. The frame may also be directed to the control module 202 in certain cases. These cases are discussed below. The FcFlowIngress task 506 is deployed on each port processor in the datapath. The primary responsibilities of this task include:

1. Dispatch any incoming Fibre Channel frame from other tasks (such as iSCSI, FcpNonRw) to an FcXbar thread 508 for sending across the crossbar interface 504.
2. Allocate and de-allocate any exchange related contexts.
3. Perform any Fibre Channel frame translations.
4. Recognize error conditions and report "sense" data to the FcNonRw task.
5. Update usage and related counters.
6. Forward a virtualized frame to multiple targets (such as a Virtual Target LUN that spans or mirrors across multiple Physical Target LUNs).
7. Create and manage any new exchange-related contexts.

The FcXbar thread 508 is responsible for sending frames on the crossbar interface 504. In order to minimize data copies, this thread preferably uses scatter-gather and frame header translation services of hardware. This FcXbar thread 508 is performed by the cell builder 444.

Frames received from the crossbar interface 504 that need processing are provided to an FcFlowEgress task 507. The primary responsibilities of this task include:

1. Allocate and de-allocate any exchange related contexts.
2. Perform any Fibre Channel frame translations.
3. Recognize error conditions and report "sense" data to the FcNonRw task.
4. Update usage and related counters.

If no processing is required or after completion by the FcFlowEgress task 507, frames are provided to the FCFrameEgress task 509. Essentially this task handles transmitting the frames and is primarily done in hardware, including the frame builder 454 and the transmit node 456.

An FcpNonRw thread 510 is deployed on the control module 202. The primary responsibilities of this task include:

1. Analyze FC frames that are not Read or Write (basic link service and extended link service commands). In general, many of these frames would be forwarded to a GenericScsi task 516.
2. Keep track of error processing, including analyzing AutoSense data reported by the FcFlowLtWt and FcFlowHwyWt threads.
3. Invoke NameServer tasks to add any newly discovered Initiators and Targets to the NameServer database.

A Fabric Controller task 512 is deployed on the control module 202. It implements the FC-SW-2 and FC-AL-2 based Fibre Channel services for frames addressed to the fabric controller of the switch (D_ID 0xFFFFFD as well as Class F frames with PortID set to the DomainId of the switch). The task performs the following operations:

1. Selects the principal switch and principal inter-switch link (ISL).
2. Assigns the domain id for the switches.
3. Assigns an address for each port.
4. Forwards any SW_ILS frames (Switch FSPF frames) to the FSPF task.

A Fabric Shortest Path First (FSPF) task 514 is deployed on the control module 202. This task receives Switch ILS messages from the FabricController 512 task. The FSPF task 514 implements the FSPF protocol and route selection algorithm. It also distributes the results of the resultant route tables to all exit ports of the switch. An implementation of the FSPF task 514 is described in the co-pending patent application entitled, "Apparatus and Method for Routing Traffic in a Multi-Link Switch", U.S. Ser. No. 10/610,371, filed Jun. 30, 2003; this application is commonly assigned and its contents are incorporated herein.

The generic SCSI task 516 is also deployed on the control module 202. This task receives SCSI commands enclosed in FCP frames and generates SCSI responses (as FCP frames) based on the following criteria:

1. For Virtual Targets, this task maintains the state of the target. It then constructs responses based on the state.

2. The state of a Virtual Target is derived from the state of the underlying components of the physical target. This state is maintained by a combination of initial discovery-based inquiry of physical targets as well as ongoing updates based on current data.

3. In some cases, an inquiry of the Virtual Target may trigger a request to the underlying physical target.

An FcNameServer task 518 is also deployed on the control module 202. This task implements the basic Directory Server module as per FC-GS-3 specifications. The task receives Fibre Channel frames addressed to 0xFFFFFC and services these requests using the internal name server database. This database is populated with Initiators and Targets as they perform a Fabric Login. Additionally, the Name Server task 518 implements the Distributed Name Server capability as specified in the FC-SW-2 standard. The Name Server task 518 uses the Fibre Channel Common Transport (FC-CT) frames as the protocol for providing directory services to requesters. The Name Server task 518 also implements the FC-GS-3 specified mechanism to query and filter for results such that client applications can control the amount of data that is returned.

A management server task 520 implements the object model describing components of the switch. It handles FC Frames addressed to the Fibre Channel address 0xFFFFFA. The task 520 also provides in-band management capability. The module generates Fibre Channel frames using the FC-CT Common Transport protocol.

A zone server 522 implements the FC Zoning model as specified in FC-GS-3. Additionally, the zone server 522 provides merging of fabric zones as described in FC-SW-2. The zone server 522 implements the "Soft Zoning" mechanism defined in the specification. It uses FC-CT Common Transport protocol service to provide in-band management of zones.

A VCMConfig task 524 performs the following operations:

1. Maintain a consistent view of the switch configuration in its internal database.

2. Update ports in I/O modules to reflect consistent configuration.

3. Update any state held in the I/O module.

4. Update the standby control module to reflect the same state as the one present in the active control module.

As shown in FIG. 7, the VCMConfig task 524 updates a VMMConfig task 526. The VMMConfig task 526 is a thread deployed on the port processor 400. The task 524 performs the following operations:

1. Update of any configuration tables used by other tasks in the port processor, such as FC frame forwarding tables. This update shall be atomic with respect to other ports.

2. Ensure that any in-progress I/Os reach a quiescent state.

The VMMConfig task 526 also updates the following: FC frame forwarding tables, IP frame forwarding tables, frame classification tables, access control tables, snapshot bit, and virtualization bit.

Figure 8:
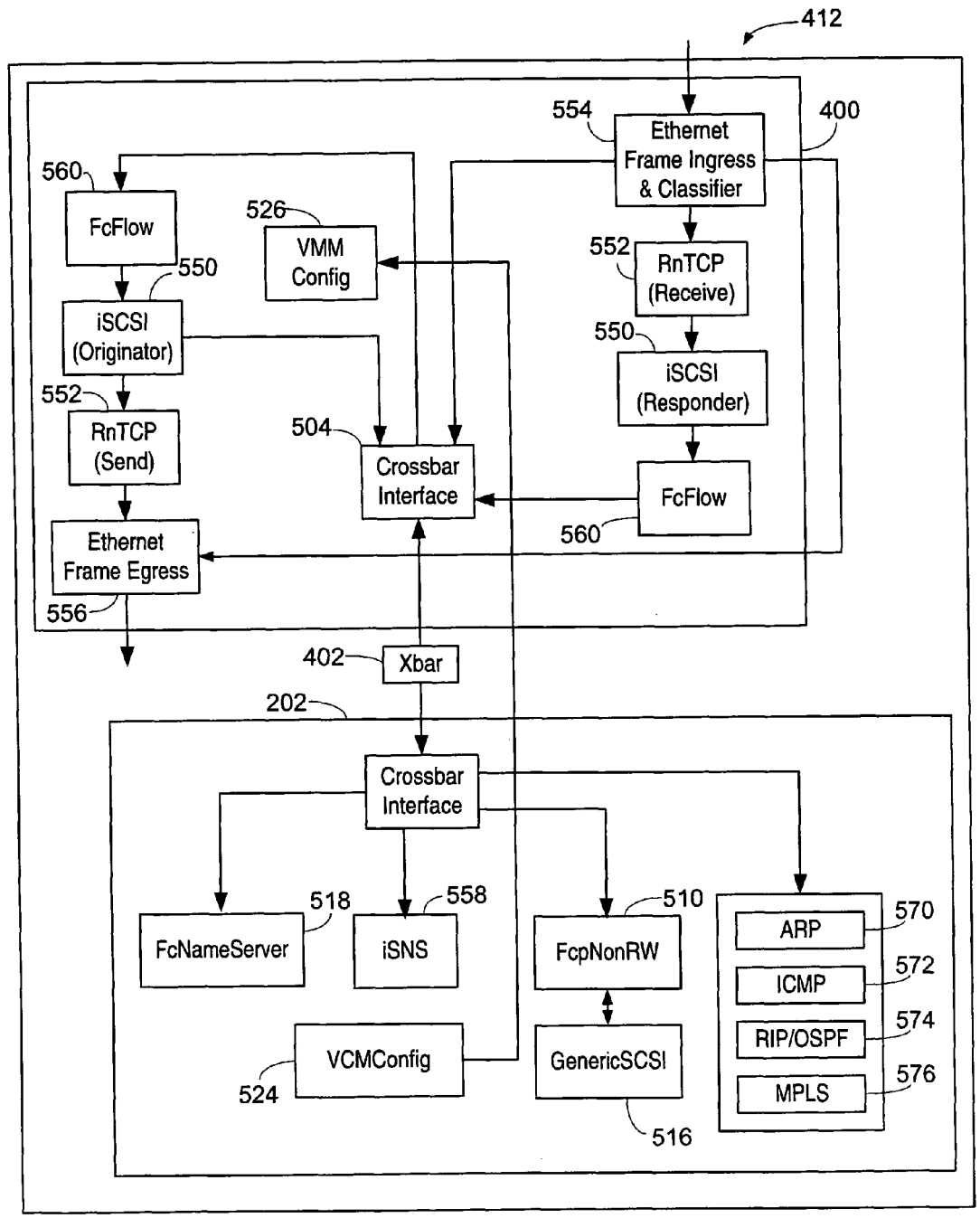
FIG. 8 illustrates an IP connectivity module configured in accordance with an embodiment of the invention.

FIG. 8 illustrates an implementation of the IP connectivity processor 412 of the invention. The IP connectivity processor 412 implements IP and iSCSI connectivity tasks. As in the case of the Fibre Channel connectivity processor 410, the IP connectivity processor 412 is implemented on both the port processors 400 of the I/O module 200 and on the control module 202.

The IP connectivity processor 412 facilitates seamless protocol conversion between Fibre Channel and IP networks, allowing Fibre Channel SANs to be interconnected using IP technologies. ISCSI and IP Connectivity is realized using tasks and threads that are deployed on the port processors 400 and control module 202.

An iSCSI thread 550 is deployed on the port processor 400 and implements iSCSI protocol. The iSCSI thread 550 is only deployed at the ports where the Gigabit Ethernet (GigE) interface exists. The iSCSI thread 550 has two portions, originator and responder. The two portions perform the following tasks:

1. Interact with an RnTCP task 552 to send and receive iSCSI PDUs. It also responds to TCP/IP error conditions, as generated by the RnTCP task.

2. Generate FC Frames across the crossbar interface 504 for frames that need to be converted into FC frames.

3. Interact with the FcNameServer task 518 to map the WWN of an FC target and obtain its DAP address.

4. Resolve IP end-point and switch port information from the iSNS task 558.

5. Manage the context space associated with currently active I/Os.

6. Optimize FC frame generation using scatter-gather techniques.

The iSCSI thread 550 also implements multiple connections per iSCSI session. Another capability that is most useful for increasing available bandwidth and availability is through load balancing among multiple available IP paths.

The RnTCP thread 552 is deployed on each port processor 400 and also has two portions, send and receive. This thread is responsible for processing TCP streams and provides PDUs to the iSCSI module 550. The interface to this task is through standard messaging services. The responsibilities of this task include:

1. Listening for and handling incoming TCP connection requests.

2. Managing TCP sequence space using TCP ACK and Window updates.

3. Recognizing iSCSI PDU boundaries.

4. Constructing an iSCSI PDU that minimizes data copies, using a scatter-gather paradigm.

5. Managing TCP connection pools by actively monitoring and terminating idle TCP connections.

6. Identifying TCP connection errors and reporting them to upper levels.

An Ethernet Frame Ingress thread 554 is responsible for performing the MAC functionality of the GigE interface, and delivering IP packets to the IP layer. In addition, this thread 554 dispatches the IP packet to the following tasks/threads.

1. If the frame is destined for a different IP address (other than the IP address of the port) it consults the IP forwarding tables and forwards the frame to the appropriate switch port. It uses forwarding tables set up through ARP, RIP/OSPF and/or static routing.

2. If the frame is destined for this port (based on its IP address) and the protocol is ARP, ICMP, RIP etc. (anything other than iSCSI), it forwards the frame to a corresponding task in the control module 202.

3. If the frame is an iSCSI packet, it invokes the RnTCP task 552, which is responsible for constructing the PDU and delivering it to the appropriate task.

4. Update performance and related counters.

The primary components of the Ethernet Frame Ingress task 554 are the receive node 430 and the frame classifier 432.

An Ethernet Frame Egress thread 556 is responsible for constructing Ethernet frames and sending them over the Gigabit Ethernet node 432. The Ethernet Frame Egress thread 556 performs the following operations:

1. If the frame is locally generated, it uses scatter-gather lists to construct the frame.

2. If the frame is generated at the control module, it adds the appropriate MAC header and routes the frame to the Ethernet transmit node 456.

3. If the frame is forwarded from another port (as part of the IP Forwarding), it generates a MAC header and forwards the frame to the Ethernet node.

4. Update performance and related counters.

The primary components of the Ethernet Frame Egress task 556 are the frame builder 454 and the transmit node 456.

The VMMConfig thread 526 is responsible for updating IP forwarding tables. It uses internal messages and a three-phase commit protocol to update all ports. The VCMConfig task 524 is responsible for updating IP forwarding tables to each of the port processors. It uses internal messages and a three-phase commit protocol to update all ports.

An iSNS task 558 is responsible for servicing IP Storage Network Services (iSNS) requests from external iSNS servers. The iSNS protocol specifies these requests and is an IETF (Internet Engineering Task Force) standard.

The FcFlow module 560 is used for Fibre Channel connectivity services. This module includes modules 507 and 506, which were discussed in connection with FIG. 7. Frames arriving at the Ethernet receive node 430 are routed to the Ethernet Frame Ingress module 554. As discussed above, TCP processing is performed at the RnTCP module 552, and the iSCSI module 550 generates FC Frames and sends them to the FcFlow thread 560 for transmission to appropriate modules. Similarly the FcFlow thread 560 receives FC frames from the crossbar interface 504 and converts them for use by the ISCSI thread 550. Note that this flow of messages allows both virtual and physical targets to be accessible using the iSCSI connections.

An ARP task 570 implements an ARP cache and responds to ARP broadcasts, allowing the GigE MAC layer to receive frames for both the IP address configured at that MAC interface as well as for other IP addresses reachable through that MAC layer. Since the ARP task is deployed centrally, its cache reflects all MAC to IP mappings seen on all switch interfaces.

An ICMP task 572 implements ICMP processing for all ports. An RIP/OSPF task 574 implements IP routing protocols and distributes route tables to all ports of the switch. Finally, an MPLS module 576 performs MPLS processing.

Figure 9:
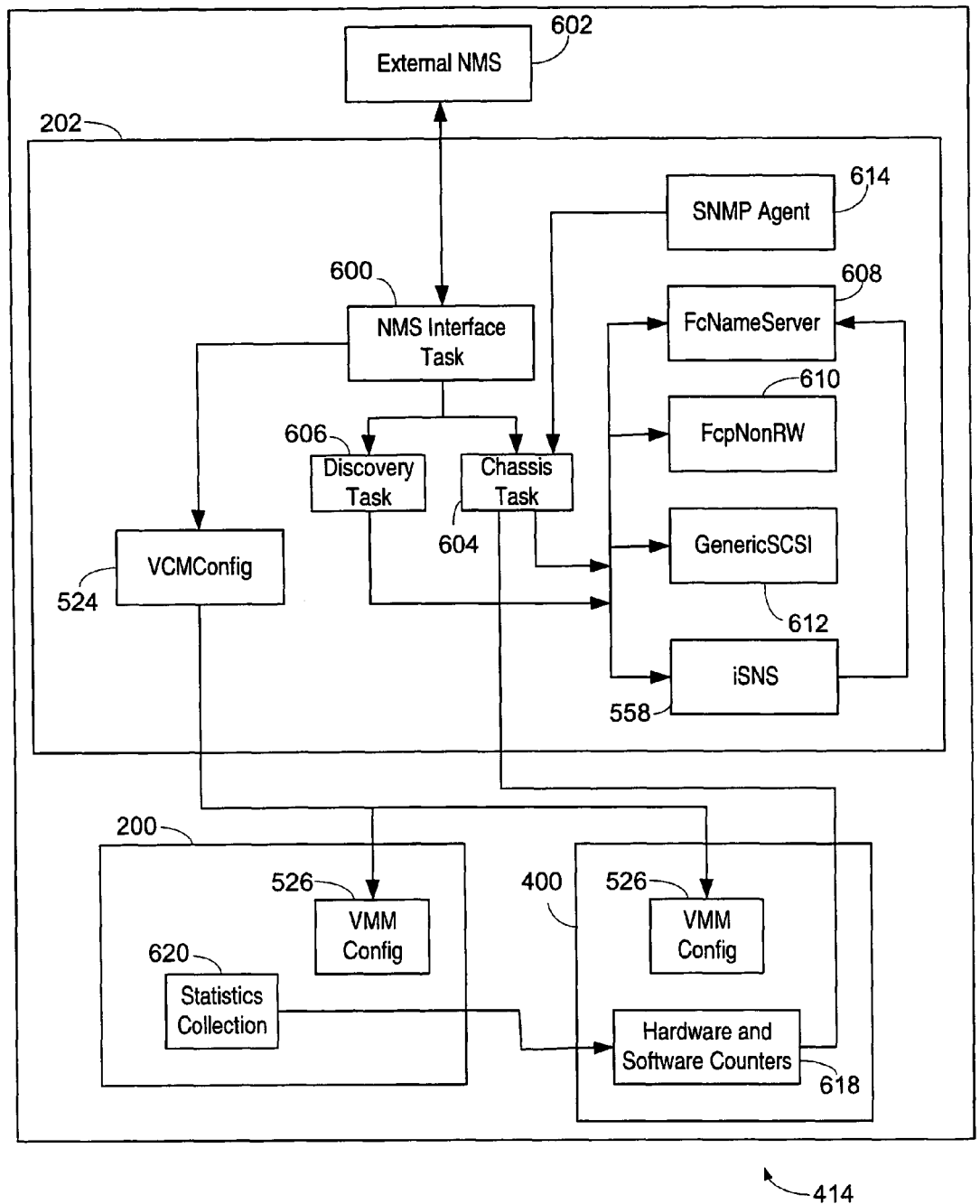
FIG. 9 illustrates a management module configured in accordance with an embodiment of the invention.

FIG. 9 illustrates an implementation of the management processor 414 of the invention. The operations of the management processor 414 are distributed between the control module 202 and the I/O module 200. FIG. 9 illustrates a port processor 400 of the I/O module 200 as a separate block simply to underscore that the port processor 400 performs certain operations, while other operations are performed by other components of the I/O processor 200. It should be appreciated that the port processor 400 forms a portion of the I/O module 200.

The management processor 414 implements the following tasks:

1. Basic switch configuration.

2. Persistent repository of objects and related configuration information in a relational database.

3. Performance counters, exported as raw data as well as through SNMP.

4. In-band management using Fibre Channel services, such as management services.

5. Configuring storage services, such as virtualization and snapshot.

6. In-band management using Fibre Channel services.

7. Support topology discovery.

8. Provide an external API to switch services.

Communication between tasks may be implemented through the following techniques.

1. Messages sent using standard messaging services.

2. XML messages from an external network management system to the switch.

3. SNMP PDUs.

4. In-band Fibre Channel (FC-CT) based messages.

A Network Management System (NMS) Interface task 600 is responsible for processing incoming XML requests from an external NMS 602 and dispatching messages to other switch tasks. A Chassis Task 604 implements the object model of the switch and collects performance and operational status data on each object within the switch.

A Discovery Task 606 aids in discovery of physical and virtual targets. This task issues FC-CT frames to an FcNameServer task 608 with appropriate queries to generate a list of targets. It then communicates with an FcpNonRW task 610, issuing an FCP SCSI Report LUNs command, which is then serviced by a GenericScsi module 612. A Discovery Task 606 also collects and reports this data as XML responses.

An SNMP Agent 614 interfaces with the Chassis Task 604 on the control module 202 and a Statistics Collection task 620 on the I/O module 200. The SNMP Agent 614 services SNMP requests. FIG. 9 also illustrates hardware and software counters 618 on the port processor 400. The remaining modules of FIG. 9 have been previously described.

As described above, the frame classifier 432 is configured to deliver certain frames to certain queues, such as the zero-touch queue 439, the output queue 438 and the embedded processor queue 436. Thus the frame classifier 432 makes the initial data/fast path or control/slow path decision. As stated above, for FC frames the classifier 432 examines the SID, DID, F_CTL, R_CTL, OXID, RXID and FCP_CMD values and certain other values. These values are used to classify the frames as zero touch, fast path or control path. As FC is used primarily for FCP traffic in a SAN, that use will be described in more detail. The classifier 432 classifies essentially all non-SCSI or non-FCP frames as control path and appropriately places them in the output queue 435 for transfer to the control processor 202. The particular frames in this group include session management frames such as FLOGI, PLOGI, PRLI, LOGO, PRLO, ACC, LS_RJT, ADISC, FDISC, TPRLO, RRQ, and ELS. Certain frames such as ABTS, BA_ACC and BA_RJT are originally provided to the embedded processor for fast path handling but may be transferred to the control path.

The next group of frame types are the non-read/write (non-R/W) SCSI or FCP frames. These are also treated as control path frames. Examples are TUR, INQUIRY, START/STOP UNIT, READ, CAPACITY, REPORT LUNS, MODE SENSE, SCSI RESERVE/RELEASE, and TARGET RESET.

The next group are virtualized FCP or SCSI read and write command frames. By virtualized here, the word refers to any cases where frame processing must be done, such as snapshotting, journaling, migrating, mirroring or true virtualization. These are fast path processed by the embedded processors. Next are virtualized FCP read data frames. For those frames they are fast path processed with the embedded processor at the egress port handling the processing. That leads to virtualized FCP write data frames. These are fast path processed by the ingress embedded processor. Both FCP_XFER_RDY and FCP_RESP frames are fast path processed by the embedded processor at the egress port. Thus the frames are placed in the output queue 438 with directions to be placed in receive queue 450 at the egress port. The remaining group of frames are non-virtualized FCP frames which are just being switched at the layer 2 level. These are zero touch fast path frames and queued accordingly.

There are also some cases where fast path operations are transferred to the control path by the embedded processor. Examples, which will be clearer after reading descriptions provided below, include extent faults, as during data migration; a map fault or missing session information; certain failures, such as path or I/O; write protect faults; and map change conditions such as filling of a write journal.

In certain cases, such as dirty region logging or write serialization when mirroring, the operations are faulted from one embedded processor in a port to another for synchronization purposes.

IP frames are fast path or control path classified in an analogous manner, except that layer 2 switching is not done in the preferred embodiment so there are no zero touch cases. Thus the control path is used for all non-R/W iSCSI command processing, including Login, Logout and SCSI Task Management.

Returning to FIG. 4, the I/O module 200 includes a snapshot processor 416. The snapshot processor 416 also forms a portion of the control module 202 of FIG. 6. The difficulties associated with backing up data in a multi-user, high-availability server system with many users is known. If updates are made to files or databases during a backup operation, it is likely that the backup copy will have parts that were copied before the data was updated, and parts that were copied after the data was updated. Thus, the copied data is inconsistent and unreliable.

There are two ways to deal with this problem. One approach is called cold backup, which makes backup copies of data while the server is not accepting new updates from end users or applications. The problem with this approach is that the server is unavailable for updates while the backup process is running.

The other backup approach is called hot backup. With hot backup, the system can be backed up while users and applications are updating data. There are two integrity issues that arise in hot backups. First, each file or database entity needs to be backed up as a complete, consistent version. Second, related groups of files or database entities that have correlated data versions must be backed up as a consistent linked group.

One approach to hot backup is referred to as copy-on-write or snapshotting. The idea of copy-on-write is to copy old data blocks on disk to a temporary disk location when updates are made to a file or database object that is being backed up. The old block locations and their corresponding locations in temporary storage are held in a special bitmap index, which the backup system uses to determine if the blocks to be read next need to be read from the temporary location. If so, the backup process is redirected to access the old data blocks from the temporary disk location. When the file or database object is done being backed up, the bitmap index is cleared and the blocks in temporary storage are released.

Software snapshots work by maintaining historical copies of the file system's data structures on disk storage. At any point in time, the version of a file or database is determined from the block addresses where it is stored. Therefore, to keep snapshots of a file at any point in time, it is necessary to write updates to the file to a different data structure and provide a way to access the complete set of blocks that define the previous version.

Software snapshots retain historical point-in-time block assignments for a file system. Backup systems can use a snapshot to read blocks during backup. Software snapshots require free blocks in storage that are not being used by the file system for another purpose. It follows that software snapshots require sufficient free space on disk to hold all the new data as well as the old data.

Software snapshots delay the freeing of blocks back into a free space pool by continuing to associate deleted or updated data as historical parts of the filing system. Thus, filing systems with software snapshots maintain access to data that normal filing systems discard.

Snapshot functionality provides point-in-time snapshots of volumes. The volume that is snapshot is called the Source LUN. The implementation is based on a copy-on-write scheme, whereby the first write I/O to a block on a Source LUN causes a copy of the block of data into the Snapshot Buffer. The size of the block copied is referred to as the Snapshot Line Size. Access to the Snapshot Volume resolves the location of a Snapshot Line between the Snapshot Buffer and the Source LUN and retrieves the appropriate block.

Figure 10:
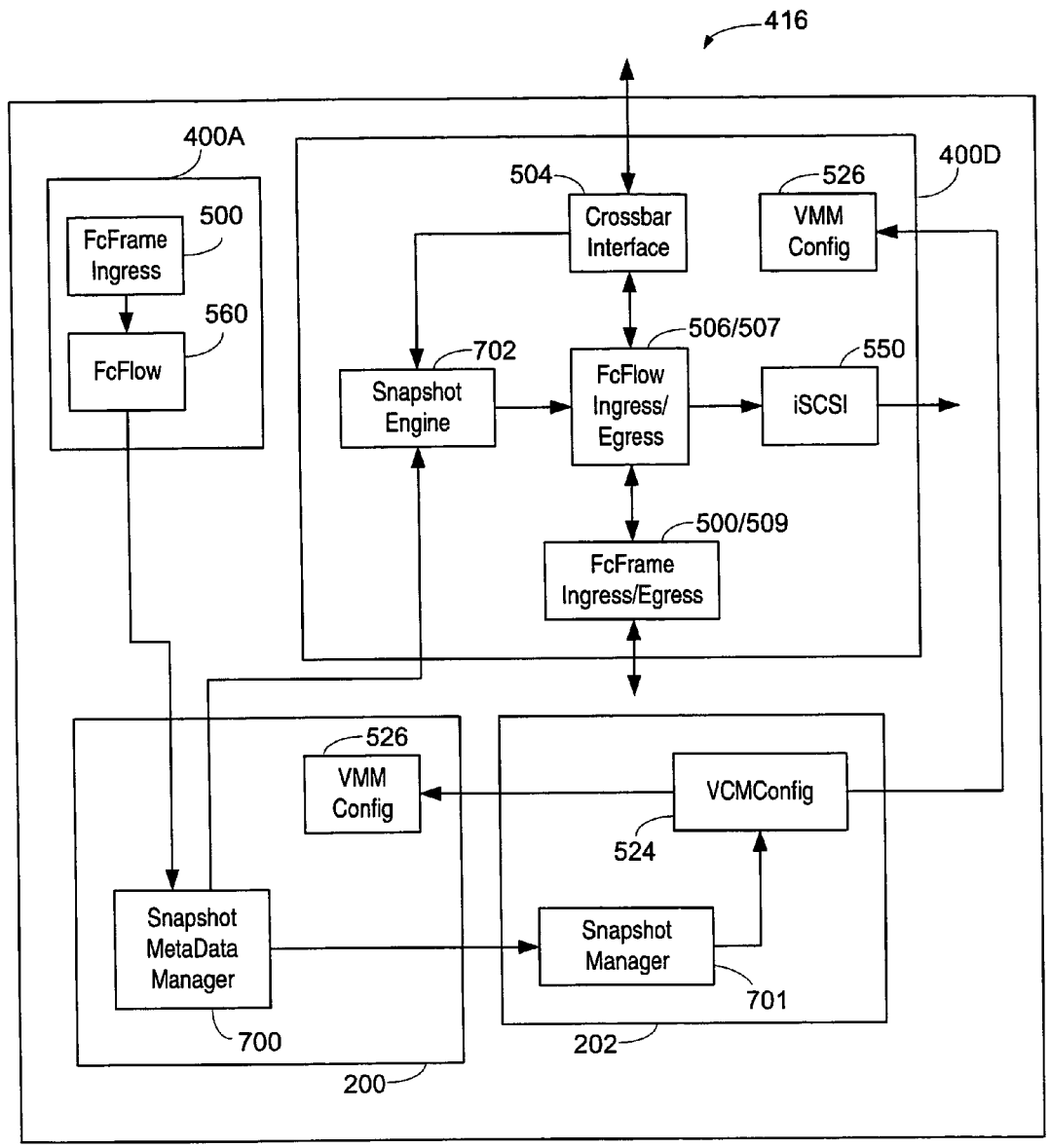
FIG. 10 illustrates a snapshot processor configured in accordance with an embodiment of the invention.

Snapshot is implemented using the snapshot processor 416, which includes the tasks illustrated in FIG. 10. FIG. 10 illustrates that the snapshot processor 416 is implemented on the I/O module 200, including a host ingress port 400A and a snapshot buffer port 400D. The snapshot processor 416 is also implemented on the control module 202. The various crossbar interfaces and the crossbar switch are omitted for clarity. The snapshot processor 416 implements:

1. Processing both in-band and out-of-band requests for Snapshot Configuration, such as Snapshot Creation, Deletion and Snapshot Buffer Allocation.

2. Generating messages to VCMConfig 524 in order to deliver new configurations automatically to other tasks involved in the snapshot. Configurations are distributed on the I/O module 200 and port processors 400 of the Snapshot Buffer as well as to update tables on ports where WRITE I/Os to the Source LUN enter the switch.

3. Managing policies, security, and the like.

4. Error logging, error recovery, and the like.

5. Status and information reporting.

A snapshot meta-data manager 700 is also deployed on the I/O module 200 and implements:

1. Snapshot meta-data lookup.

2. Keeping an up-to-date map of the block list corresponding to Snapshot Line size.

3. Recreating and re-building meta-data during initialization from the Snapshot Buffer.

A snapshot manager 701 is deployed on the control module 202 to receive various snapshot management information and generate messages to VCMConfig 524.

A snapshot engine 702 is deployed on the port processors 400 where the snapshot buffer is attached. The snapshot engine 702 implements:

1. Receipt of Copy-On-Write requests from the Snapshot Meta-Data Manager 700.

2. Frame forwarding to FcFlow 560, which then forwards a READ I/O of the old data for Copy-On-Write to the port where the snapshot buffer is attached.

3. Sending the new WRITE I/O to the Source LUN port after the READ I/O is complete.

4. Monitoring for errors and invoking appropriate error-handling activities in the snapshot manager.

Figure 11:
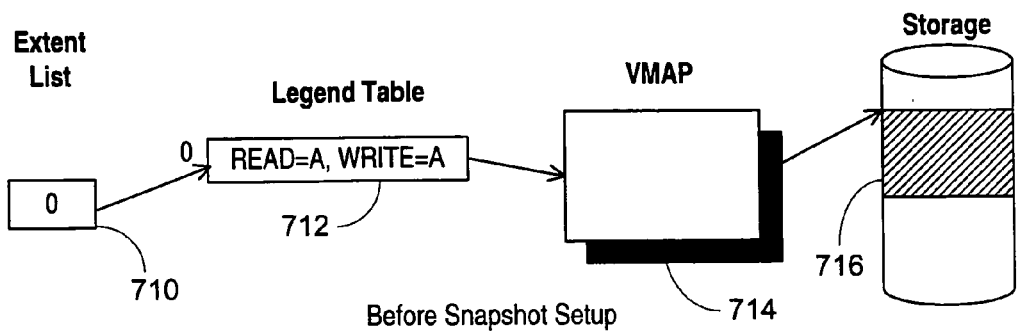
FIGS. 11-13 illustrate snapshot processing performed in accordance with an embodiment of the invention.
Figure 12:
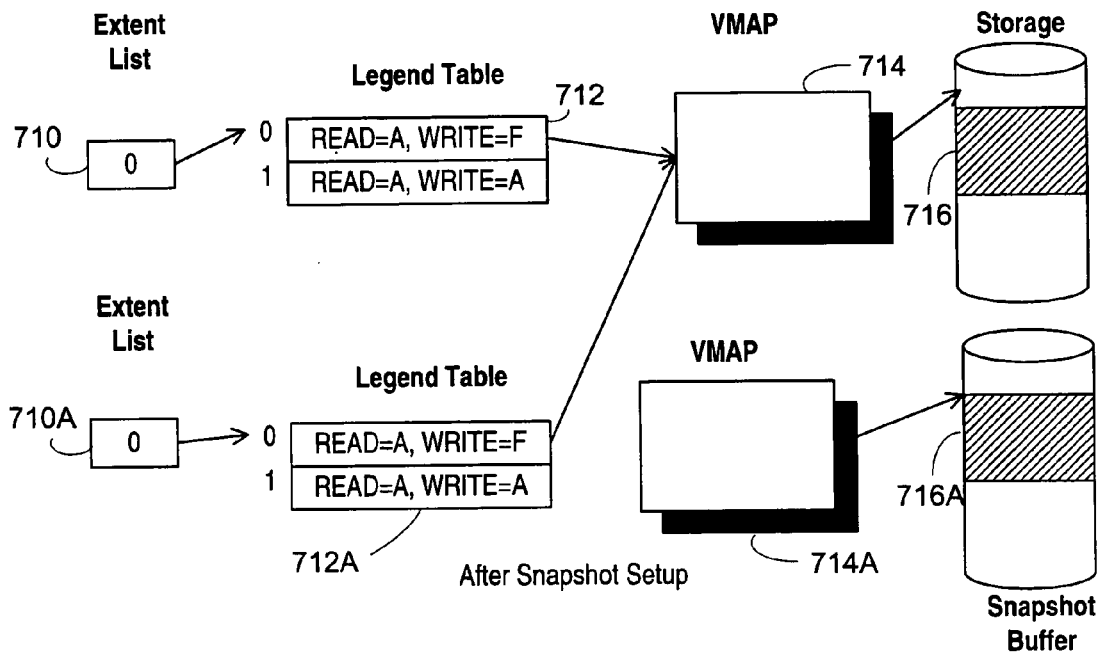
Figure 13:
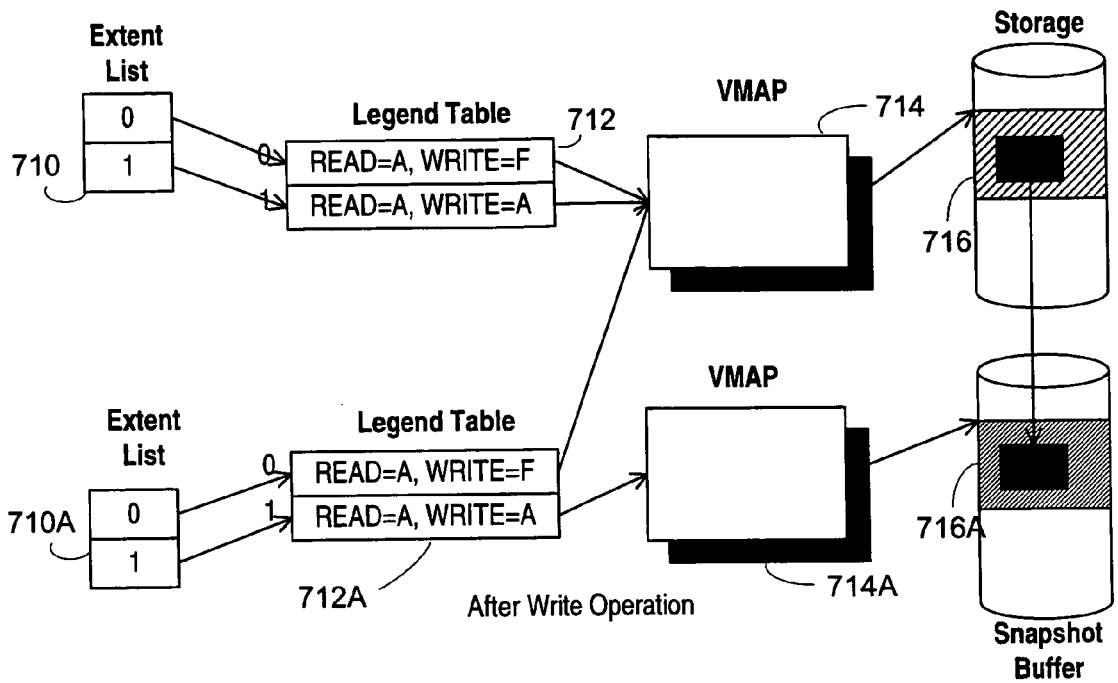

The operation of the snapshot processor 416 is more fully appreciated in connection with FIGS. 11-13. The following example uses the terms READ or WRITE and A (ALLOW), H (HOLD) or F (FAULT). If READ=F, the read operation sends a fault condition to the control path. If READ=A, the read operation is allowed. If READ=H, the read operation is held. There is a similar definition for writes.

In this example, the VT/LUN or volume used is called the primary VT/LUN. VT stands for Virtual Target, while LUN is logical unit number. VT is used as the snapshot operation can occur on virtual targets as well as physical targets. Its point-in-time image is called a snapshot VT/LUN or volume. A snapshot target will always be a virtual target, as its data is split between LUNs. Assume that the primary VT/LUN has an extent list 710 that contains a single extent. The extent references slot 0 in a legend table 712. This slot has READ=A and WRITE=A. FIG. 11 illustrates this configuration before setting up a snapshot. In particular, the figure illustrates an extent list 710, a legend table 712, a virtual map (VMAP) 714, and physical storage 716.

To prepare the VT/LUN for a snapshot, a snapshot extent list 710A, legend table 712A, and VMAP 714A are developed. Basically, an extent list contains a series of block offsets, lengths and related legend table indices. A legend table contains a series of read and write attributes and the identity of a volume map or VMAP. A VMAP is present for each volume and contains a series of entries including the VMAP identifier; the block size; storage descriptors, such as device LUN and block offset, for each relevant volume; the total number of descriptors equal to the number of mirrors plus one times the number of stripes plus one; the number of mirrors; the number of stripes; the stripe size; a write mask, for identifying which mirror volumes are active; a preferred read mask, which specifies the volume to read; and a read mask, which defines the potential read volumes to allow fault tolerance. There is an extent list for each volume but extent legend entries are preferably shared between extent lists. The extent legends can point to a shared or a unique VMAP. In other instances, there may be a single extent list and two separate legend tables. The relationship will become clearer in the following examples.

The VMAP 714A can be initially empty or fully populated. FIG. 12 illustrates duplicate versions of the extent list 710, legend table 712, and VMAP 714 after setting up the snapshot. Some of the legend table 712 AND 712A slots reference the same VMAPs. In both cases, legend slot 1 is allocated but not used because there are no extents that map to legend slot 1.

FIG. 13 illustrates after a write operation where the write operation occurs to the source or primary VT/LUN. A write operation attempt occurs and sends a fault condition to the control path. The control path provides a COPY command to copy the original data from the primary storage 716 to the snapshot buffer 716A. If the snapshot buffer 716A is not previously allocated, it is allocated at this point. The extent lists 710 and 710A are adjusted and a new extent list entry is created corresponding to the data range copied. Future access to this extent through both extent list 710 and 710A leads to legend slot 1 in the relevant legend table 712 and 712A that references the new storage copied. Now the legend map entry for 0 is changed to WRITE=A and stored in slot 1. Alternatively, the legend map entries could be created when the legend table is created and then simply referenced in the extent list. The extent list 710 on the primary VT/LUN is also adjusted and a new extent is created corresponding to the data range copied. The referenced legend action is now 1, with the READ and the WRITE both now allowed (A). The original write operation is allowed to continue. In the future, write operations to the same extent do not cause a fault. Thus, any reads or writes to the primary VT/LUN occur normally, after copying of the data on the initial write. Writes to the snapshot VT/LUN occur normally to the snapshot buffer 716A for data that has been copied, though this is an unusual operation. Writes to the snapshot VT/LUN to areas that have not been copied fault as if to the primary VT/LUN, and the same VMAP entry is used. Reads to the snapshot VT/LUN occur from the snapshot buffer 716A if the data has been copied or occur from the source 716 if the data has not been copied, as legend slot 0 points to the original VMAP 714 while legend slot 1 points to the snapshot VMAP 714A.

Observe that in accordance with the invention, a snapshot operation is performed by the setting a few bits (e.g., the READ and WRITE bits) in the legend table and/or the extent list. Thus, the snapshot operation is compactly and efficiently executed on a port basis in the fast path, as opposed to a system wide basis, which avoids delays and central control issues with the control path. It occurs on a port basis because only the ports which are the locations of the virtual targets need be changed, as all relevant frames will be routed to those ports.

Figure 14B:
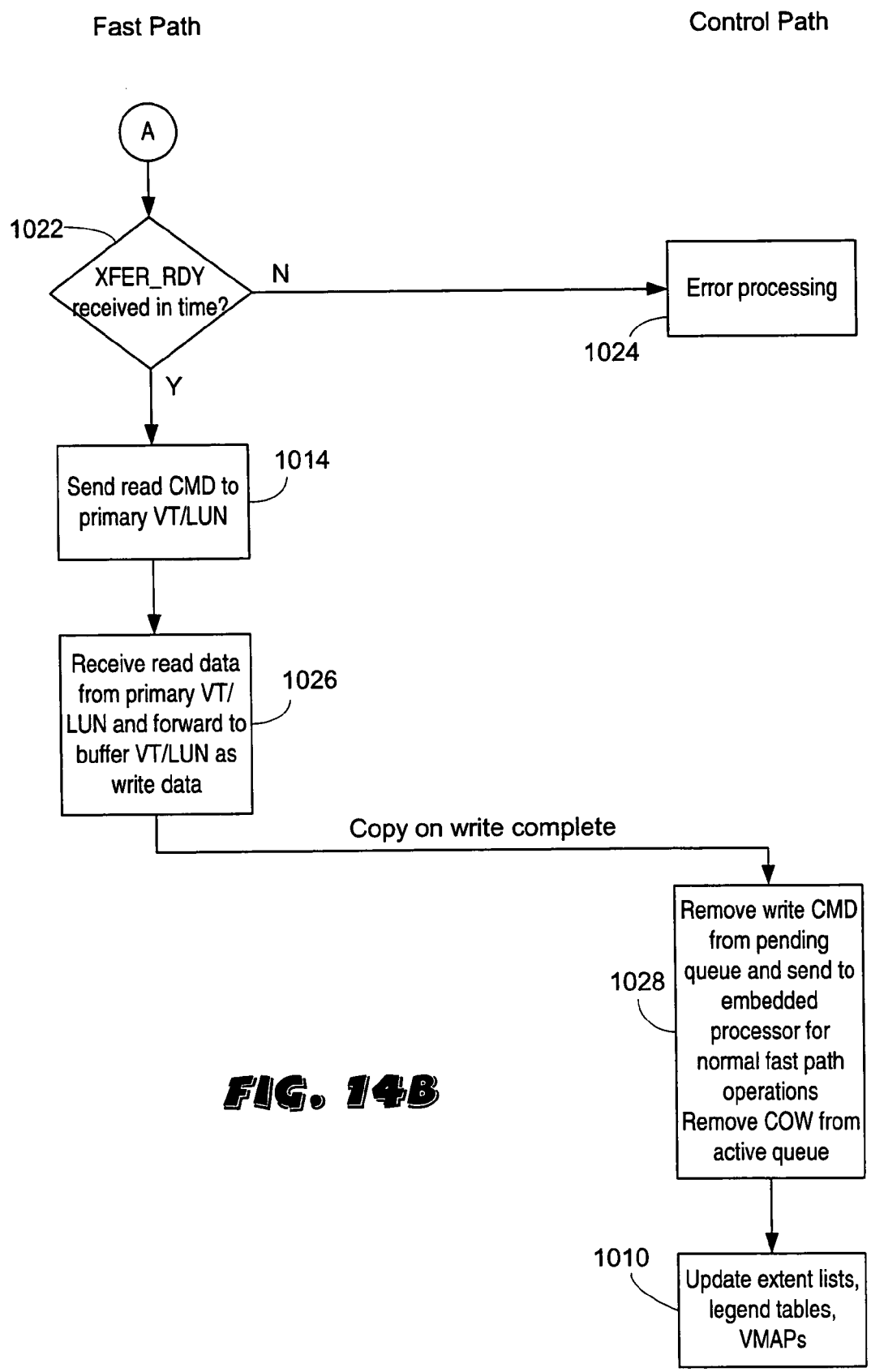

A fast path/control path breakdown of the above copy on write case in a snapshot is shown in FIGS. 14A and 14B. In step 1002 an embedded processor receives a write command directed to the primary volume or VT/LUN. In step 1004 the hardware retrieves the extent list, the entry legend table entry and the VMAP entry and provides them to the embedded processor. In step 1006 the embedded processor determines if a fault bit is set or if there has been a lookup error. If not, the operation is performed normally in step 1008. If so, if there has been an error or a fault bit is set, which in this case would be a fault, the command is forwarded to the control path processor for operation in step 1012 where the control path processor inserts an indication of the write command operation in a pending queue and places a copy on write indication in an active queue. Control then proceeds to step 1020 where the embedded processor sends a write command to the buffer VT/LUN. In step 1022 the embedded processor determines if a XFER_RDY has been received from the buffer VT/LUN in time. If not, again an error process occurs with the control path processor in step 1024. If the XFER_RDY is received in time, in step 1014 the embedded processor sends a read command for the relevant extent to the primary VT/LUN. Then in step 1026 the embedded processor receives the read data from the primary VT/LUN and forwards it to the buffer VT/LUN as write data. This continues until the copy on write is complete, at which time control proceeds to step 1028 where the control path processor, now understanding that the block has been copied, removes the original write command indication from the pending queue and sends the command to the embedded processor for normal fast path operations. In addition, the copy on write indicator is removed from the active queue. As a final step, in step 1010, the control processor updates the extent lists, the legend tables and the VMAPS to add this particular instance to those tables.

The above operation described snapshot operations where the old data is copied to the snapshot volume and the new data is then placed in the primary volume. In an alternate snapshot operation, the new data is written to the snapshot volume and any future read operations of the primary volume are directed to the new data on the snapshot volume. This alternate can be readily handled by using appropriate legend table entries, where, after the write operation, the entry points both reads and writes to the primary volume to the snapshot volume via its associated VMAP. Appropriate changes would also be made to the fast path and control path operations.

Returning to FIG. 4, the I/O processor 200 also includes a mirroring processor 424. Mirroring is an operation where duplicate copies of all data are kept. Reads are sourced from one location but write operations are copied to each volume in the mirror. The phrase "mirroring" is normally used when the multiple write operations occur synchronously, as opposed to asynchronous mirroring, or journaling or replication as described below.

Figure 15:
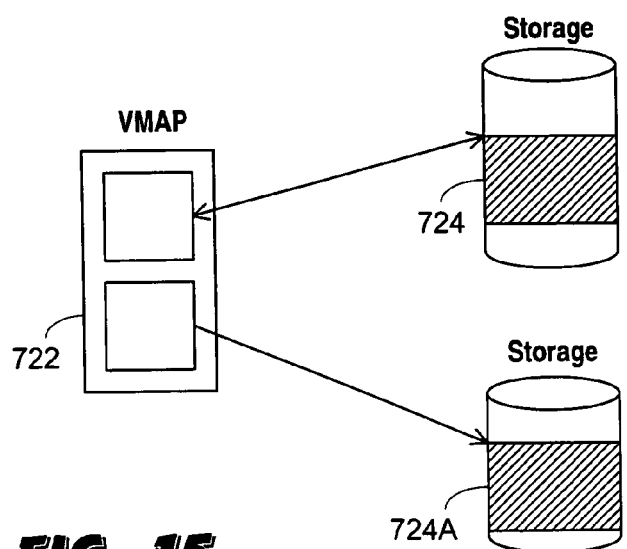
FIG. 15 illustrates mirroring performed in accordance with an embodiment of the invention.

FIG. 15 illustrates mirroring. In a mirroring case, the VMAP 722 has two entries, one for storage 724 and one for storage 724A, the two storage units in the exemplary mirror, though more units could be used if desired. On processing the VMAP 722, a copy of the write operation is sent to each of the listed devices. A read is sourced only from storage 724 by properly setting the preferred read bits in the VMAP 722 entry. Thus, as with snapshotting, mirroring can be implemented by setting a few bits in a table.

Figure 16A:
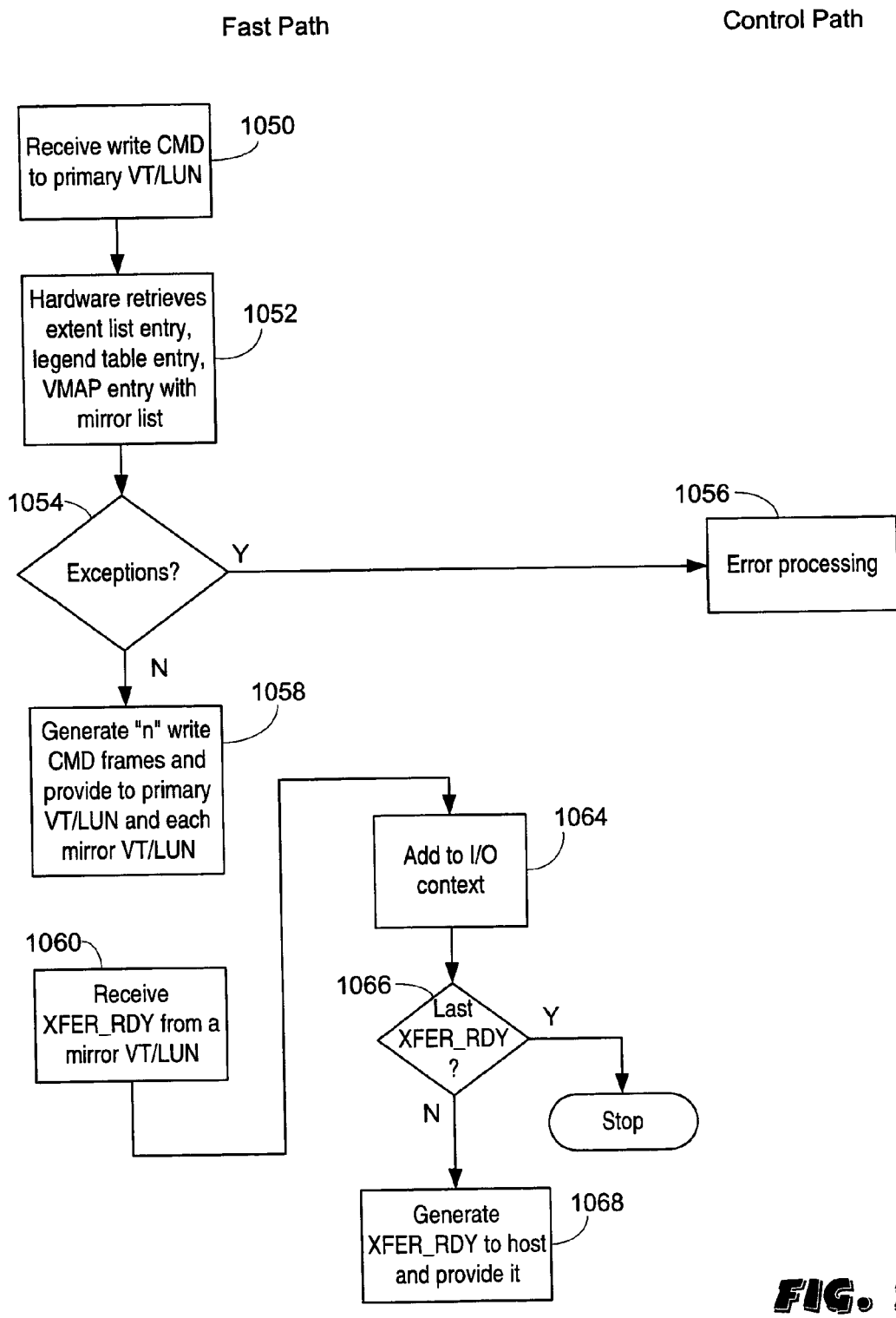
FIGS. 16A and 16B are flowchart illustrations of a mirror operation in accordance with an embodiment of the invention.
Figure 16B:
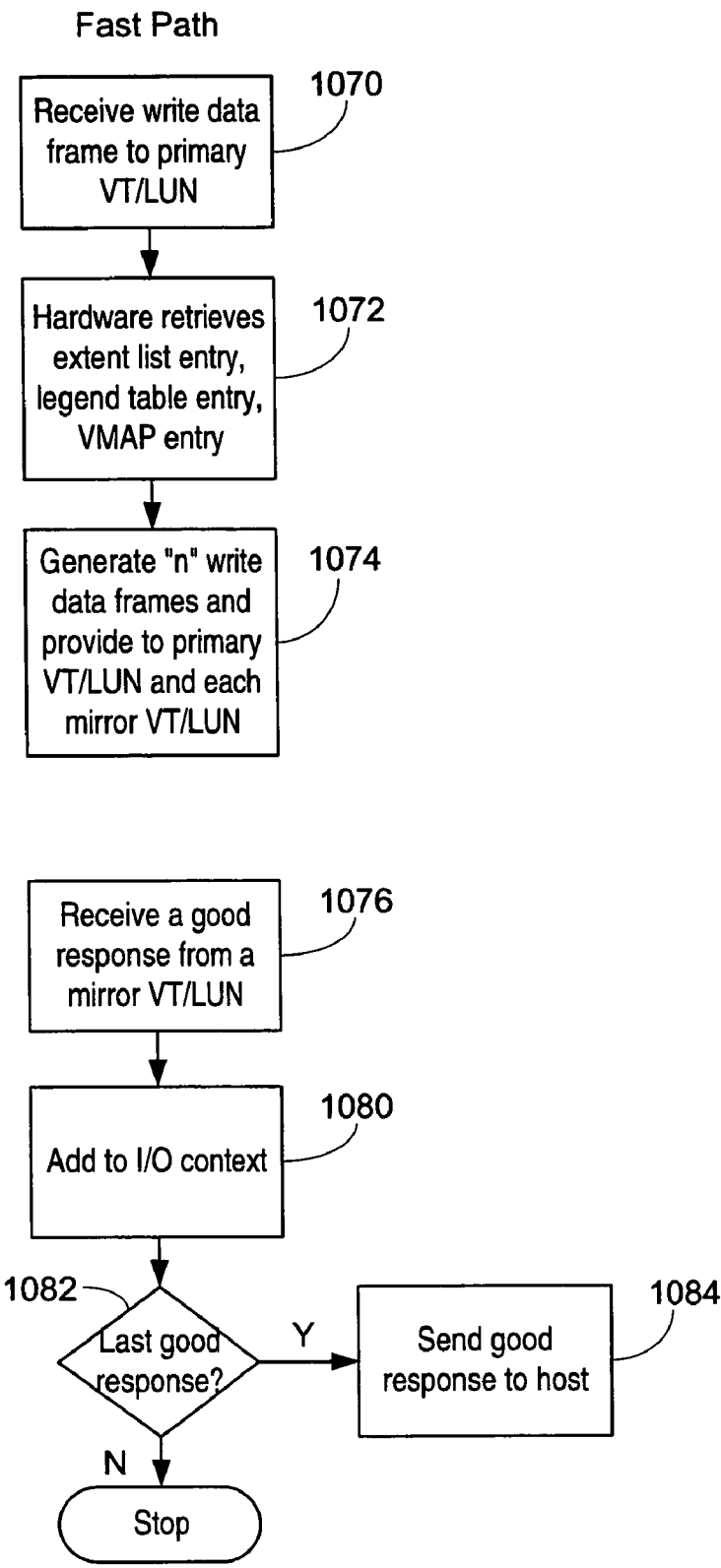

A fast path/control path breakdown of for mirroring operations is shown in FIGS. 16A and 16B. In step 1050 the embedded processor receives a write command directed to the primary VT/LUN. In step 1052 the hardware retrieves the extent list, the related legend table entry and the related VMAP entry containing a mirror list and provides this to the embedded processor. In step 1054 the embedded processor determines if there have been any exceptions developed during this retrieval process. If so, control proceeds to step 1056 in the control path where the control processor does any exception handling. If there have been no exceptions, control proceeds to step 1058 where the embedded processor generates "n" write command frames, one for each particular mirror, and provides the generated write commands to the mirror VT/LUNs and the original write command to the primary VT/LUN. This thread completes at this time.

Shortly thereafter in step 1060 the embedded processor begins receiving XFER_RDY frames from a mirror VT/LUN. In step 1064 the embedded processor provides an indication to an I/O context that the transfer ready has been received from this particular VT/LUN. An I/O context is used to collect the data for the particular I/O sequence that is occurring and would be generated during the operations on the initial frame of the sequence. In step 1066 the embedded processor determines if the last XFER_RDY has been received. If not, this operation ceases. If so, in step 1068 the embedded processor generates a XFER_RDY frame to the host and sends it to the host. This thread then ceases.

In step 1070, the embedded processor begins receiving write data directed to the primary VT/LUN. Again, the hardware retrieves the extent list, legend table entry and VMAP entry and provides it to the embedded processor in step 1072. In step 1074 the embedded processor generates "n" write data frames and provides the original data frame and the additionally generated data frames to the primary VT/LUN and each of the mirror VT/LUNs. This thread then ceases.

Sometime later, in step 1076 the embedded processor receives a good response from the primary and/or mirror VT/LUN. As usual, in step 1078 the hardware loads the context and information and in step 1080 the embedded processor adds the good response to the I/O context for this particular operation. In step 1082 the embedded processor determines if this was the last good response. If not, the thread ends. If so, a good response is sent to the host in 1084 and the next data frame can be provided.

It is noted that exception checking is generally not shown in these flow charts for simplification. Any exceptions, such as timeout errors, fault errors, message not received errors, or errors returned from a device are treated as exceptions and provided to the control path. Further, it is also noted that creation, removal and so on commands of mirror drives will be non-SCSI commands and those will be forwarded directly to the control path for control path operation of these higher level functions.

Returning to FIG. 4, the I/O processor 200 also includes a journaling processor 418. The journaling processor 418 is also implemented on the control module 202, as shown in FIG. 6. Journaling is closely related to disk mirroring. As its name implies, disk mirroring provides a duplicated data image of a set of information. As described above, disk mirroring is implemented at the block layer of the I/O stack and done synchronously. Journaling provides similar functionality to disk mirroring, but works at the data structure layer of the I/O stack. Journaling typically uses data networks for transferring data from one system to another and is not as fast as disk mirroring, but it offers some management advantages.

Asynchronous journaling or replication is implemented using write splitting and write journaling primitives. In write splitting, a write operation from a host is duplicated and sent to more than one physical destination. Write splitting is a part of normal mirroring. In write journaling, one of the mirrors described by the storage descriptor is a write journal. When a write operation is performed on the storage descriptor, it splits the write into two or more write operations. One write operation is sent to the journal, and the other write operations are sent to the other mirrors.

The write journal provides append-only privileges for write operations initiated by the host. Data is formatted in the journal with a header describing the virtual device, LBA start and length, and a time stamp. When the journal file fills, it sends a fault condition to the control path (similar to a permission violation) and the journal is exchanged for an empty one. The control path asynchronously copies the contents of the journal to the remote image with the help of an asynchronous copy agent.

Figure 17:
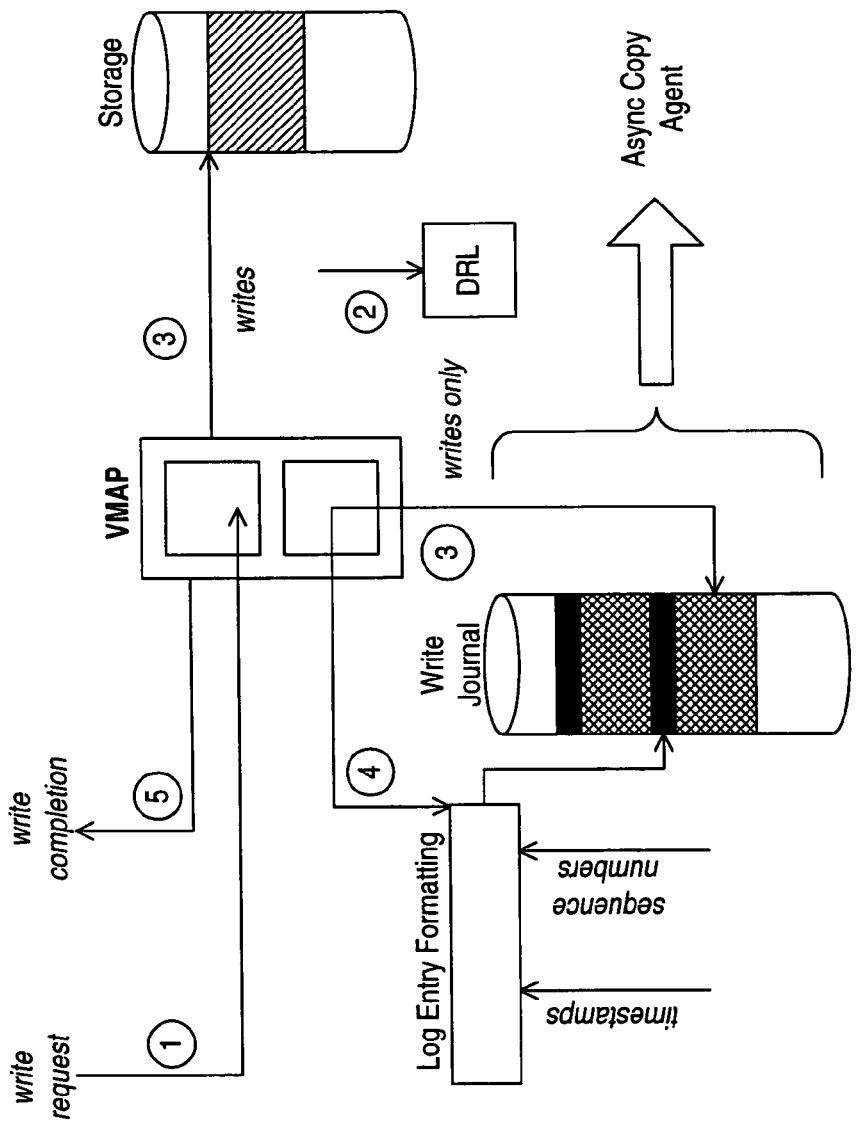
FIG. 17 illustrates journaling processing performed in accordance with an embodiment of the invention.

FIG. 17 shows a sequence of operations performed in accordance with an embodiment of the journaling processor 418. First, a write request is delivered to the virtual device, as shown with arrow 1 of FIG. 17. An update of a dirty region log is performed as shown with arrow 2. The dirty region log (DRL) is used to keep track of which regions have become dirty because of a write to the region. The use of a dirty region log greatly simplifies a resynchronization operation should a failure occur. The next available location for the journaling write request is determined and both the primary write to normal storage and the journaling write to the journal data area are sent as shown with arrow 3. A log entry is then prepared including a timestamp, the location of the journaled data and the location of the primary data. This log entry is sent to a journal log area as shown with arrow 4. Finally, the status for the host's write operation is returned as shown by arrow 5.

If the formatted write reaches the end of the write journal, a fault condition occurs and is handling by the control path as if it were writing to a read-only extent. The control path waits for the write operations to the segment in progress to complete. After the write operations complete, the control path swaps out the old journal and swaps in a new journal so that the fast path can resume journaling. The control path sends the old journal to an asynchronous copy agent to be delivered to a remote site, where the journals can be applied to the remote mirror or copy.

When journaling takes place among several virtual devices, write operations across all the journaling drives must be serial. An example of this condition is a database with table space on one virtual device and a log on a different virtual device. If the database sends a write operation to a device and receives successful completion status, it then sends a write operation to a second device. If some components crash or are temporarily inaccessible, the write operation sent to the second device may not return a completed status. When all components are back in service, the database must never see that the write operation to the second device is completed and that the write operation to the first device did not complete. This behavior is free on local devices. If there is a disaster at the source site and the stream of journal write operations received by the remote copy agent abruptly stops, the remote copy agent finishes replaying the journal write operations it has received. After it finishes, the condition that the write operation sent to the second device completed, but the write operation sent to the first device was not completed must be true.

Figure 18:
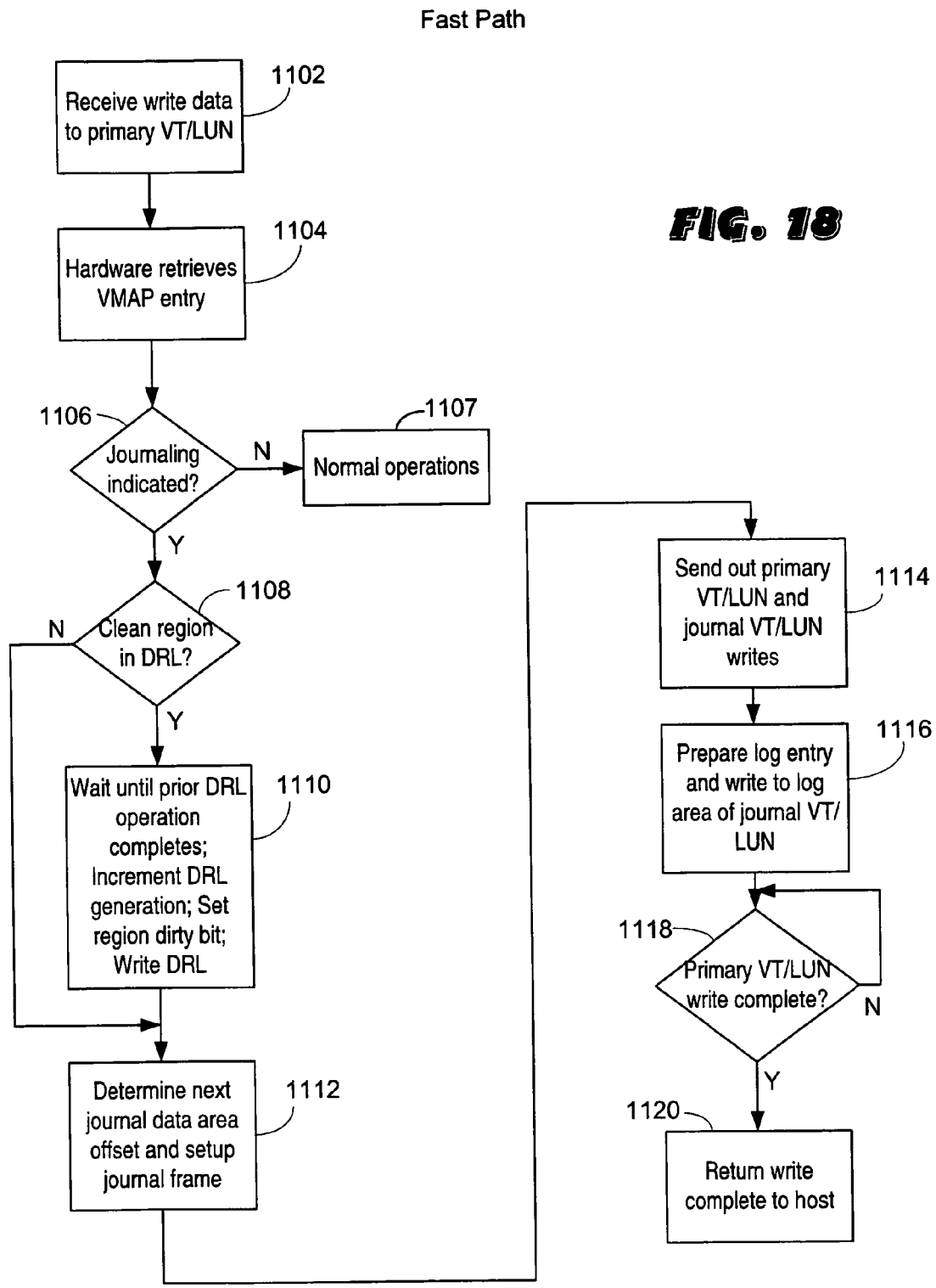
FIG. 18 is a flowchart illustration of journaling operations in accordance with an embodiment of the invention.

A more detailed explanation of the normal fast path/control path operations for a normal write case is shown in FIG. 18. In step 1102 the embedded processor receives write data directed to the primary VT/LUN. In step 1104 the hardware loads the relevant information such as the VMAP into the embedded processor. While above it was indicated that the hardware retrieves the extent list, the legend table entry and the VMAP, in this case only the VMAP is needed as no hold or fault conditions are relevant. The hardware is preferably configured to look for an extent list, and if present, to load in the three items. But if an extent list is not present, only a VMAP is loaded. Thus the hardware has the flexibility to handle both cases.

In step 1106 the embedded processor determines if journaling is indicated. If not, control proceeds to step 1108 where normal fast path operations occur. If so, control proceeds to step 1108 to determine from the DRL if this particular block on the disk is a clean region. A clean region is an indication that data has not been written to this region previously. If it is a clean region, control proceeds to step 1110 where the embedded processor waits until any prior DRL operations are indicated complete and increments a DRL generation number. The embedded processor then sets the particular region bit as dirty and writes any DRL information to the alternate DRL location. In the preferred embodiment, each time the DRL is written, it is written to an alternate location for data backup purposes. After completion of step 1110 or if it was a dirty region as determined in step 1108, control proceeds to step 1112 where the embedded processor determines the next journal data area offset and sets up a journal frame for that location. In step 1114 the original write frame is sent to the primary VT/LUN and the journal VT/LUN data write frame is provided. In step 1116 the embedded processor prepares a log entry as defined above and writes this log entry to the log area of the journal VT/LUN. In step 1118, the embedded processor determines if the primary VT/LUN write has completed. If not, it continues to do this monitoring. When it does complete, in a step 1120 the embedded processor returns a write complete to the host so that the next data packet can be provided.

Returning to FIG. 4, the I/O processor 200 also includes a migration processor 420. The migration processor 420 is also implemented on the control module 202 of FIG. 6.

Figure 19:
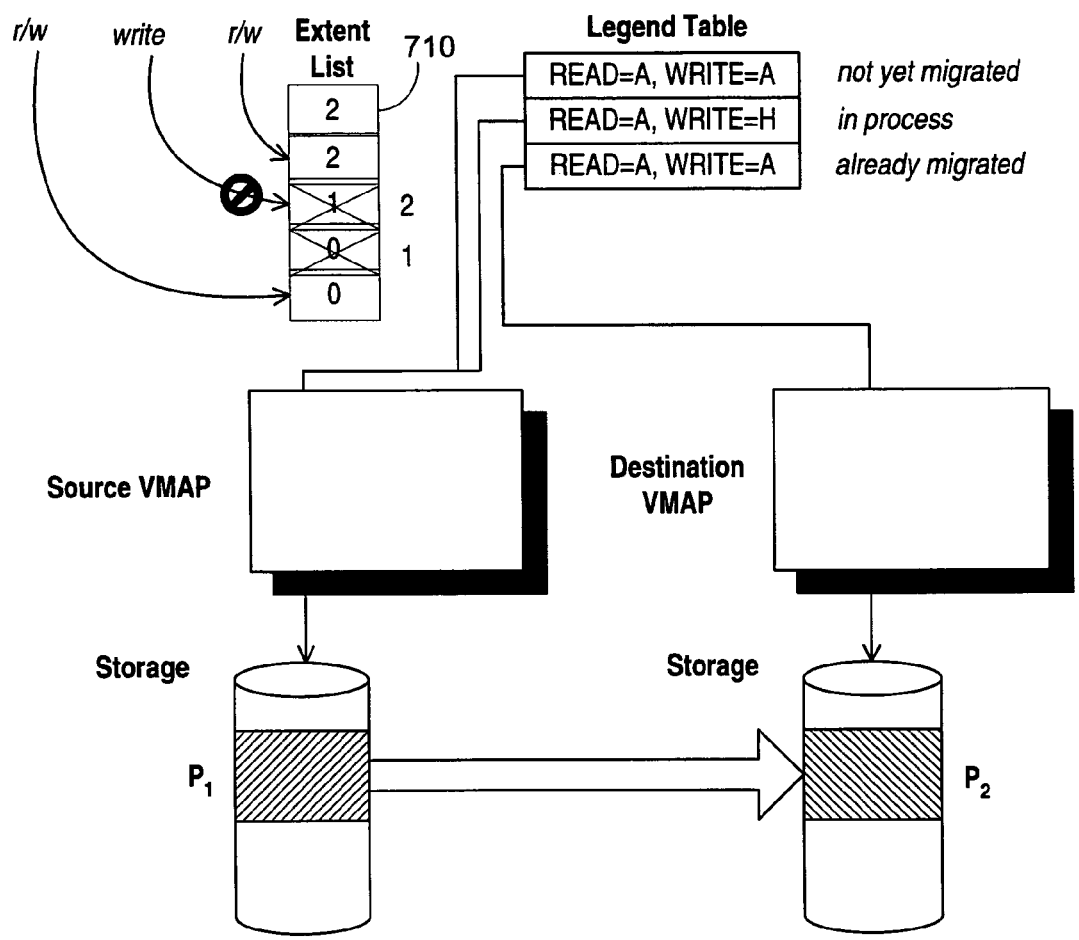
FIG. 19 illustrates migration processing performed in accordance with an embodiment of the invention.

FIG. 19 illustrates the concept of online data migration. Online migration uses the following three legend slots. Slot 0 represents data that has not been copied. It points to the old physical storage and has read/write privileges. Slot 1 represents the data that is being migrated (at the granularity of the copy agent). It points to the old physical storage and has read-only privileges. Slot 2 represents the data that has already been copied to the new physical storage. It points to the new physical storage and has read/write privileges.

The extent list 710 determines which state (legend entry) applies to the extents in the segment. During the migration process, the legend table does not change, but the extent list 710 entries change as the copy barrier progresses. The no access symbol on the write path in FIG. 19 indicates the copy barrier extent. Write operations to the copy barrier must be held until released by the copy agent. To avoid the risk of a host machine time out, the copy agent must not hold writes for a long time. The write barrier granularity must be small to allow this to occur.

In this example, the data is moved from the storage (described by the source storage descriptor or VMAP) to the storage described by the destination storage descriptor or VMAP. In FIG. 19, source and destination correspond to part of physical volumes P1 and P2.

The copy agent moves the data and establishes the copy barrier range by setting the corresponding disk extent to legend slot 1, copies the data in the copy barrier extent range from P1 to P2, and advances the copy barrier range by setting the corresponding disk extent to legend slot 2. Data that is successfully migrated to P2 is accessed through slot 2. Data that has not been migrated to P2 is accessed through slot 0. Data that is in the process of being migrated is accessed through slot 1.

Accesses before or after the copy barrier range and read operations to the copy barrier range itself are accomplished without involving the control path. A write operation to the copy barrier range itself is held by the fast path, and released when the copy barrier range moves to the next extent of the map. The migration is complete when the entire MAP references legend slot 2. After this, legend slot 0 and 1 are no longer needed.

The copy agent and fast path operations for migration are shown in FIGS. 20A and 20B. In the preferred embodiment the copy agent executes on the control path processor, with the actual read and write commands being performed by the embedded processors. In step 1140 the copy agent places a barrier indication into the extent list. In step 1142 the copy agent then creates a frame to read data from the source VT/LUN and provides this frame to an embedded processor for normal fast path processing. In step 1144 the copy agent then creates a write data command to write this data which has just been read to the destination VT/LUN and provides this frame to an embedded processor for normal fast path processing. In step 1146 the copy agent determines if this was the last extent to be transferred. If not, control proceeds to step 1148 where the next copy agent installs a barrier value into the next entry in the extent list and then replaces the entry in the current location of the extent list with a migrated value. Control then returns to step 1142 to transfer the next extent. If this was the last extent as determined in step 1146, control proceeds to step 1150 where the copy agent replaces the current extent list entry with a migrated value to indicate that the migration has completed.

In FIG. 20B the fast path operations for write operations are shown when a migration is occurring. In step 1160 the embedded processor receives a request to write to the source VT/LUN. In step 1162 the hardware loads up the various information and provides it to the embedded processor. Step 1164 the embedded processor determines if there is a hold due to the migration. This would occur because a barrier entry has been retrieved and the particular extent legend table entry indicates that WRITE=H. If not, control proceeds to step 1166 where normal write operations occur. If there is a hold due to migration, control proceeds to step 1168 where the write request to the source VT/LUN is held by the embedded processor. In step 1170 the embedded processor starts a loop to determine if the barrier has been moved from this particular extent. Once it has, control proceeds to step 1172 where the held write request is released and the operation is restarted so that a normal write operation would occur. By restarting the sequence, the hardware will be able to reload the extent tables and so on.

Returning again to FIG. 4, the I/O module also includes a virtualization processor 422. As shown in FIG. 6, the virtualization processor 422 is also resident on the control module 202. Storage virtualization provides to computer systems a separate, independent view of storage from the actual physical storage. A computer system or host sees a virtual disk. As far as the host is concerned, this virtual disk appears to be an ordinary SCSI disk logical unit. However, this virtual disk does not exist in any physical sense as a real disk drive or as a logical unit presented by an array controller. Instead, the storage for the virtual disk is taken from portions of one or more logical units available for virtualization (the storage pool).

This separation of the hosts' view of disks from the physical storage allows the hosts' view and the physical storage components to be managed independently from each other. For example, from the host perspective, a virtual disk's size can be changed (assuming the host supports this change), its redundancy (RAID) attributes can be changed, and the physical logical units that store the virtual disk's data can be changed, without the need to manage any physical components. These changes can be made while the virtual disk is online and available to hosts. Similarly, physical storage components can be added, removed, and managed without any need to manage the hosts' view of virtual disks and without taking any data offline.

Figure 21:
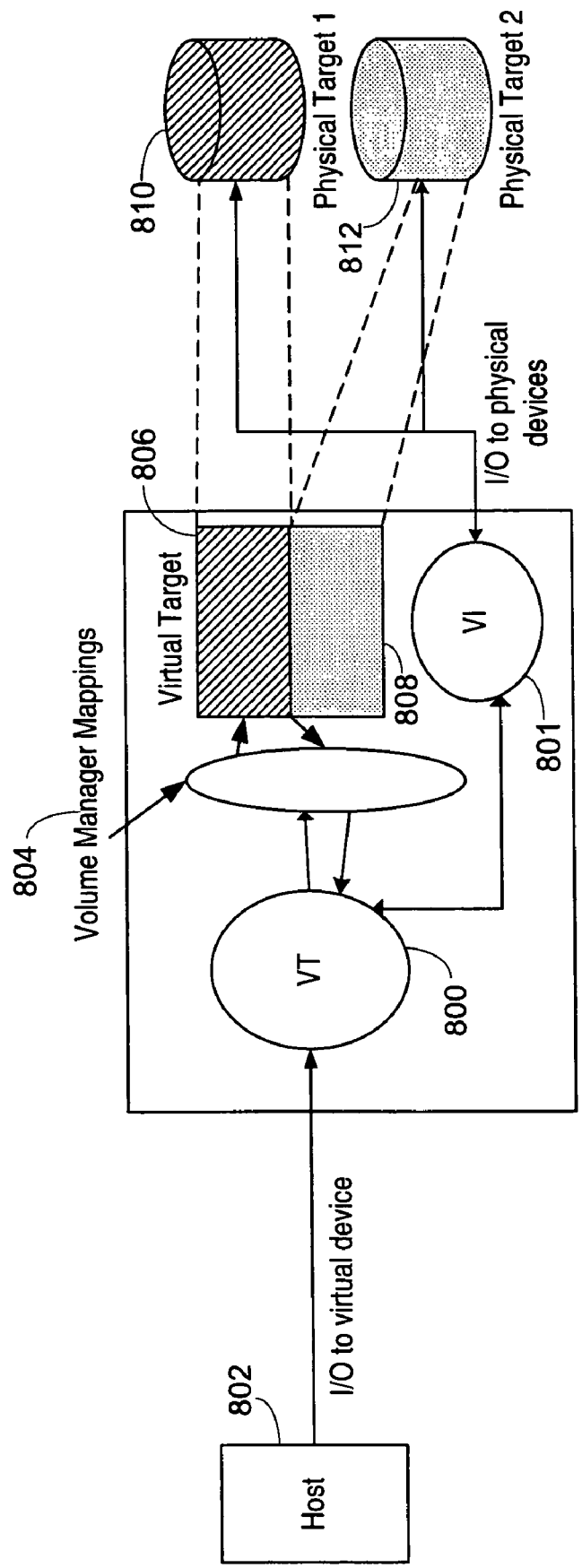
FIG. 21 illustrates a virtualization operation performed in accordance with an embodiment of the invention.

FIG. 21 provides a conceptual view of the virtualization processor 422. The virtualization processor 422 includes a virtual target 800 and virtual initiator 801. A host 802 communicates with the virtual target 800. A volume manager 804 is positioned between the virtual target 800 and a first virtual logical unit 806 and a second virtual logical unit 808. The first virtual logical unit 806 maps to a first physical target 810, while the second virtual logical unit 808 maps to a second physical target 812.

The virtual target 800 is a virtualized FCP target. The logical units of a virtual target correspond to volumes as defined by the volume manager. The virtual target 800 appears as a normal FCP device to the host 802. The host 802 discovers the virtual target 800 through a fabric directory service.

Once a host request to a virtual device is translated, requests must be issued to physical target devices. The entity that provides the interface to initiate I/O requests from within the switch to physical targets is the virtual initiator 801. Apart from virtual target implementation, the virtual initiator interface is used by other internal switch tasks, such as the snapshot processor 416. The virtual initiator 801 is the endpoint of all exchanges between the switch and physical targets. The virtual initiator 801 does not have any knowledge of volume manager mappings.

Figure 22:
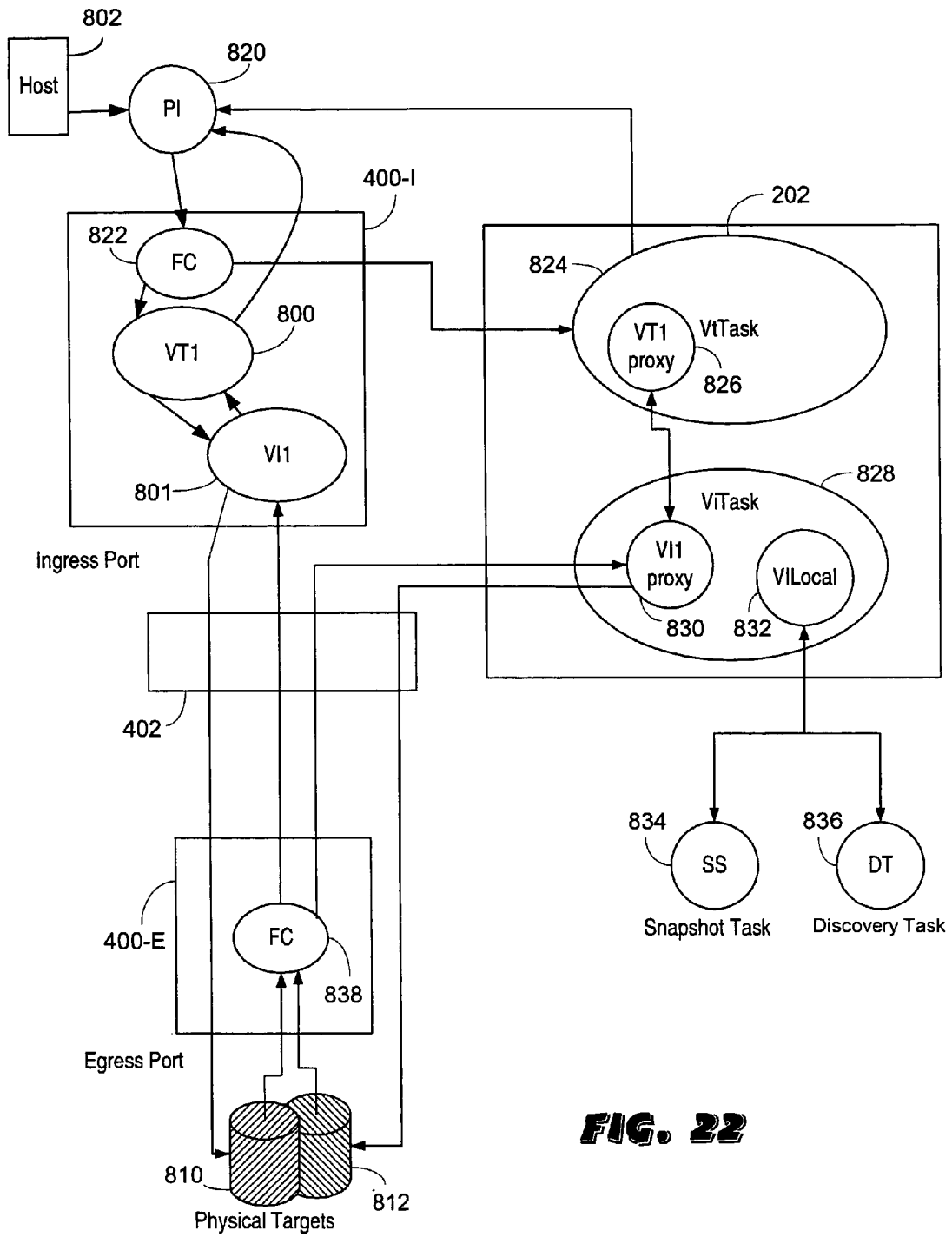
FIG. 22 illustrates virtualization operations performed on port processors and a control module in accordance with an embodiment of the invention.

FIG. 22 illustrates that the virtualization processor is implemented on the port processors 400 of the I/O module 200 and on the control module 202. Host 802 constitutes a physical initiator 820, which accesses a frame classification module 822 of the ingress port processor 400. The ingress port processor 400-I includes a virtual target 800 and a virtual initiator 801. The egress port 400-E includes a frame classifier 838 to receive traffic from physical targets 810 and 812.

The control module 202 includes a virtual target task 824, with a virtual target proxy 826. A virtual initiator task 828 includes a virtual initiator proxy 830 and a virtual initiator local task 832, which interfaces with a snapshot task 834 and a discovery task 836.

Fibre Channel frames are classified by hardware and appropriate software modules are invoked. The virtual target module 800 is invoked to process all frames classified as virtual target read/write frames. Frames classified as control path frames are forwarded by the ingress port 400-I to the virtual target proxy 826. The virtual target proxy 826 is the control path counterpart of the virtual target 800 instance running on the port processor 400-I. While the virtual target instance 800 handles all read and write requests, the proxy virtual target 826 handles all login/logout requests, non-read/write SCSI commands and FCP task management commands.

The processing of a host request by a virtual target 800 instance at the port processor 400-I and a proxy virtual target instance 824 at the control module 202 involves initiating new exchanges to the physical targets 810, 812. The virtual target 800 invokes virtual initiator 801 interfaces to initiate new exchanges. There is a single virtual initiator instance associated with each port processor. The port number within the switch identifies the virtual instance. The port number is encoded into the Fibre Channel address of the virtual initiator and therefore frames destined for the virtual initiator can be routed within the switch. The proxy virtual initiator 826 establishes the required login nexus between the port processor virtual instance 801 and a physical target.

Fibre Channel frames from the physical targets 810, 812 destined for virtual initiators are forwarded over the crossbar switch 402 to virtual initiator instances. The virtual initiator module 801 processes fast path virtual initiator frames and the virtual initiator module 830 processes control path virtual initiator frames. Different exchange ID ranges are used to distinguish virtual initiator frames as control path and fast path. The virtual initiator module 801 processes frames and then notifies the virtual target module 800. On the port processor 400-I, this notification is through virtual target function invocation. On the control module 202, the virtual target task 824 is notified using callbacks. The common messaging interface is used for communication between the virtual initiator task 828 and other local tasks.

Virtualization at the port processor 400-I happens on a frame-by-frame basis. Both the port processor hardware and firmware running on the embedded processors 442 play a part in this virtualization. Port processor hardware helps with frame classifications, as discussed above, and automatic lookups of virtualization data structures. The frame builder 454 utilizes information provided by the embedded processor 442 in conjunction with translation tables to change necessary fields in the frame header, and frame payload if appropriate, to allow the actual header translations to be done in hardware. The port processor also provides firmware with specific hardware accelerated functions for table lookup and memory access. Port processor firmware 440 is responsible for implementing the frame translations using mapping tables, maintaining mapping tables and error handling.

A received frame is classified by the port processor hardware and is queued for firmware processing. Different firmware functions are invoked to process the queued-up frames.

Module functions are invoked to process frames destined for virtual targets. Other module functions are invoked to process frames destined for virtual initiators. Frames classified for control path processing are forwarded to the crossbar switch 402.

Frames received from the crossbar switch 402 are queued and processed by firmware according to classification. Except for protocol conversion cases, as described above, and potentially other select cases, no frame classification is done for frames received from the crossbar switch 402. Classification is done before frames are sent on the crossbar switch 402.

Figure 23:
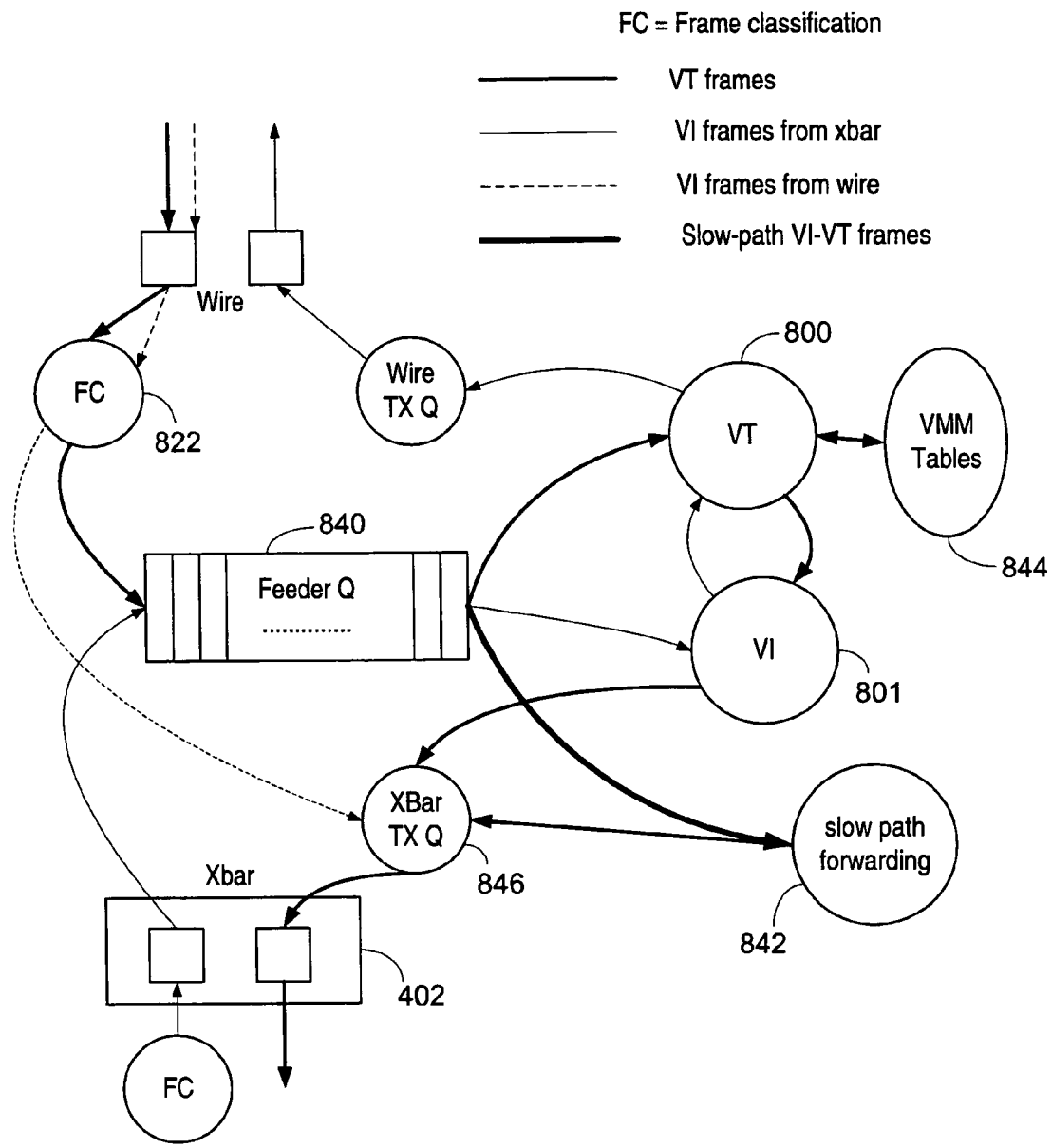
FIG. 23 illustrates port processor virtualization processing performed in accordance with an embodiment of the invention.

FIG. 23 is a state machine representation of the virtualization processor operations performed on a port processor 400. A virtual target frame received from a physical host or physical target is routed to the frame classifier 822, which selectively routes the frame to either the embedded processor or feeder queue 840 or to the crossbar switch 402. The virtual target module 800 and the virtual initiator module 801 process fast path frames provided to the queue 840. The virtual target module 800 accesses virtual message maps 844 to determine which frame values are to be changed. Control path frames are provided to the crossbar switch 402 via the crossbar transmit queue 846 for control path forwarding 842 to the control module.

The virtualization functions performed on the port processor include initialization and setup of the port processor hardware for virtualization, handling fast path read/write operations, forwarding of control path frames to the control module, handling of I/O abort requests from hosts, and timing I/O requests to ensure recovery of resources in case of errors. The port processor virtualization functions also include interfacing with the control module for handling login requests, interacting with the control module to support volume manager configuration updates, supporting FCP task management commands and SCSI reserve/release commands, enforcing virtual device access restrictions on hosts, and supporting counter collection and other miscellaneous activities at a port.

For ease of understanding, the above description and the following flowcharts have a single virtual target and a single virtual initiator in the same port. However, in some cases, such as when all the relevant ports are operating in E-port mode, multiple ports can present the same virtual target to the hosts. This is preferably done to improve load balancing and/or throughput. However, in such cases there would be multiple virtual initiators as preferably an entire transaction is handled by a single port. To reach this result, each port performs the address translations so that different addresses are provided from the virtual initiator in each port.

In some other cases, such as when the virtual target ports are operating in N_port mode, multiple virtual targets cannot be presented to the hosts. However, in those cases the virtual initiators are operating on a different port, preferably with one-to-one correspondence with the virtual target ports. This is done because, preferably, the storage devices are accessed through different ports than the hosts to improve load balancing and throughport.

Exemplary fast path operations for a number of examples are provided in FIGS. 24, 25, 26, 27, and 28. The examples are simple read, simple write, spanned read where the requested operation spans multiple physical LUNs, spanned write and simple mirrored write. The last example provides an illustration of the combination of two of the operations or processes.

Figure 24:
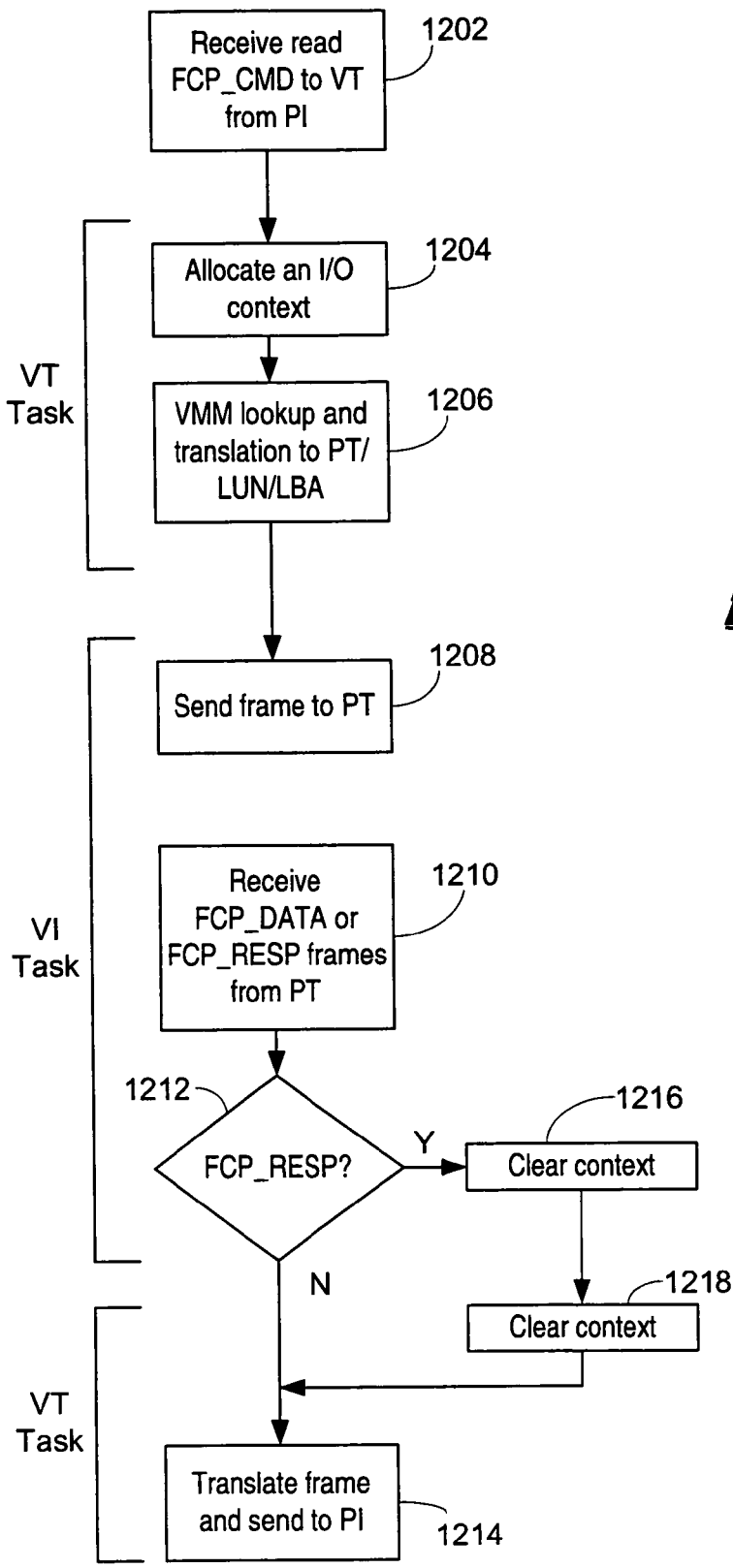
FIGS. 24-28 are flowchart illustrations of various virtualization operations in accordance with an embodiment of the invention.

A simple read is illustrated in FIG. 24. In step 1202, the embedded processor receives an FCP_CMD frame directed to the virtual target from the physical initiator. In step 1204 the virtual target task allocates an I/O context for this particular sequence. An I/O context is used to store information relating to the physical targets related to the virtual target. In step 1206 the virtual target task does a virtual manager mapping (VMM) table lookup and properly translates relevant areas to direct the FCP command to the physical target/LUN/LBA. Control then proceeds to step 1208, where the virtual initiator task on the embedded processor sends the translated frame to the physical target. This thread then ends. The virtual initiator task then receives an FCP_DATA or FCP_RESP frame from the physical target. In step 1212 the virtual initiator task on the embedded processor determines if it is an FCP_RESP frame. If not, control proceeds to step 1214 where the virtual target task translates the received frame and sends it to the physical initiator. If in step 1212 it was a response frame, then in step 1216 the virtual initiator task clears its context entries that it will have created and control proceeds to step 1218, where the virtual target task also clears it context. Then control proceeds to step 1214 so that the response frame can be forwarded to the physical initiator.

Figure 25:
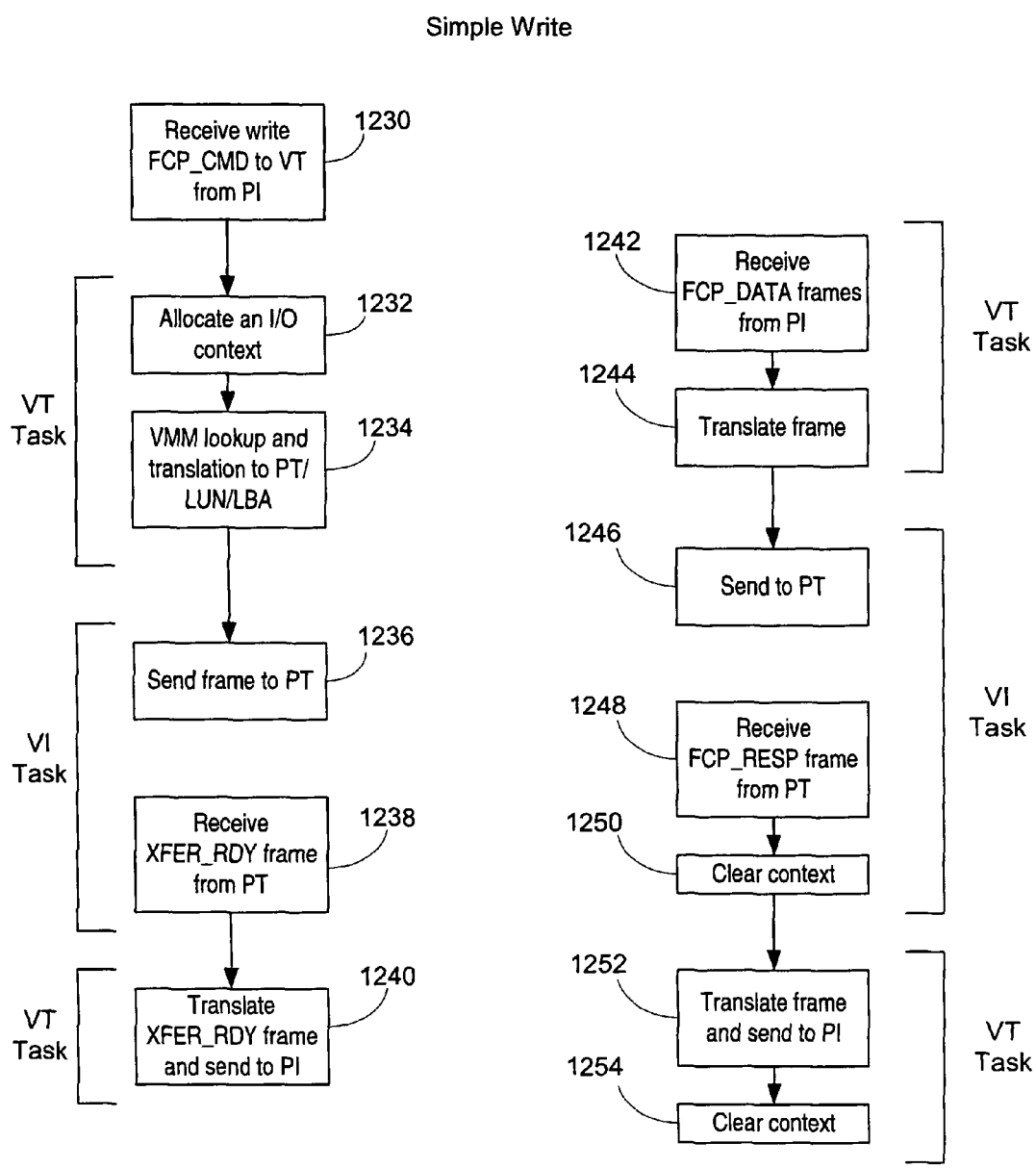

In FIG. 25 the simple write operation for virtualization environment is provided. In step 1230, the embedded processor receives an FCP_CMD frame directed to the virtual target from the physical initiator. In step 1232 the virtual target task allocates an I/O context and in step 1234 does a VMM table lookup and translates the frame to be directed to the proper physical target/LUN/LBA. In step 1236 the virtual initiator task sends the translated frame to the physical target. Some period of time later the virtual initiator task receives a XFER_RDY frame from the physical target. This frame is provided to the virtual target task and in step 1240 that task translates the XFER_RDY frame and sends it to the physical initiator. Sometime later the physical initiator begins sending data so that the virtual target task receives FCP_DATA frames in step 1242. The virtual target task translates these frames in step 1244 based on the information that will have been determined in step 1234. These frames are then provided to the virtual initiator and in step 1246 the frames were provided to the physical target. After all the data frames have completed, ultimately the physical target will reply with an FCP_RESP frame which is received by the virtual initiator in step 1248. In step 1250 the virtual initiator task clears it context entries and provides the frame to the virtual target task. In step 1252 the virtual target task translates the frame and sends it back to the physical initiator and then in step 1254 clears its context and the entire write operation is completed.

Figure 26:
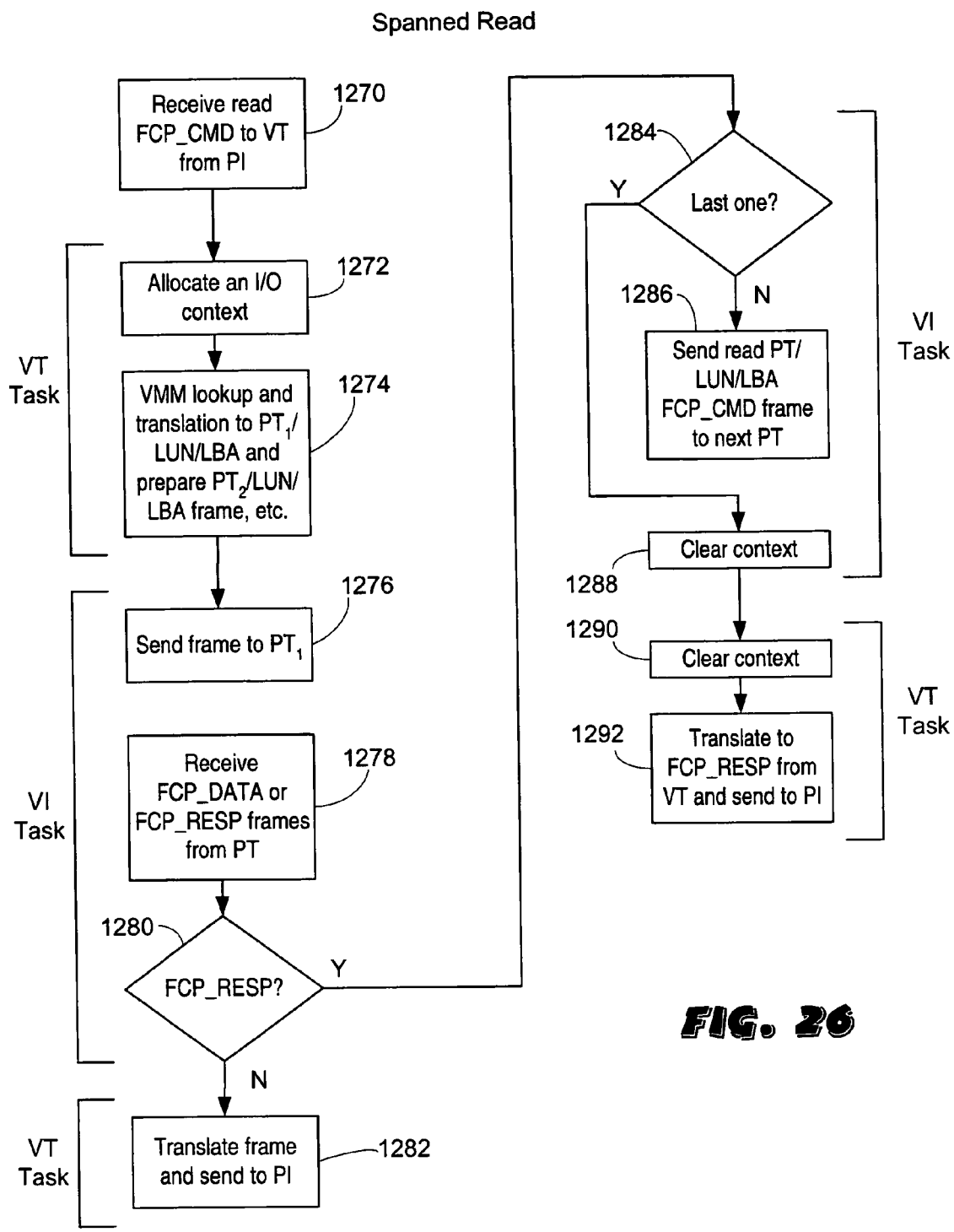

A spanned read operation is shown in FIG. 26. A spanned operation is more complex in that the virtual disk is actually comprised of multiple physical LUNs or disks. Therefore, the single stream must be broken up and directed to multiple physical targets. In step 1270 the embedded processor receives an read FCP_CMD frame directed to the virtual target for the physical initiator. In step 1272 the virtual target task allocates an I/O context in step 1274 performs a VMM table lookup. In step 1274 the virtual target task translates the command frame for operation to physical target one/LUN/LBA, physical target two/LUN/LBA and any other physical targets which are necessary to complete this operation. The command frame for the first physical target is provided to the virtual initiator and in step 1276 the virtual initiator task provides this frame to physical target one. Sometime later in an independent thread the virtual initiator begins receiving FCP_DATA or FCP_RESP frames from a physical target in step 1278. The embedded processor will determine from the I/O context which particular sequence this relates to and then in step 1280 determines if it is an FCP_RESP frame. If not, in step 1282 the virtual target task translates the frame as appropriate and sends it to the physical initiator. If it is an FCP- _RESP frame, control proceeds from step 1280 to step 1284 to determine if this is a response frame from the last of the physical targets in the series. If not, control proceeds to step 1286, where the FCP_CMD frame that has been previously generated in step 1274 is provided to the next physical target in the series of physical targets. If it was the last response frame in step 1288, the virtual initiator task clears its context. In step 1290 the virtual target task clears its context and in step 1292 it provides the translated FCP_RESP response frame from the virtual target and sends it to the physical initiator. By using the I/O context the virtual initiator and virtual target are allowed to run simple threads in an independent manner to simplify the software development.

Figure 27:
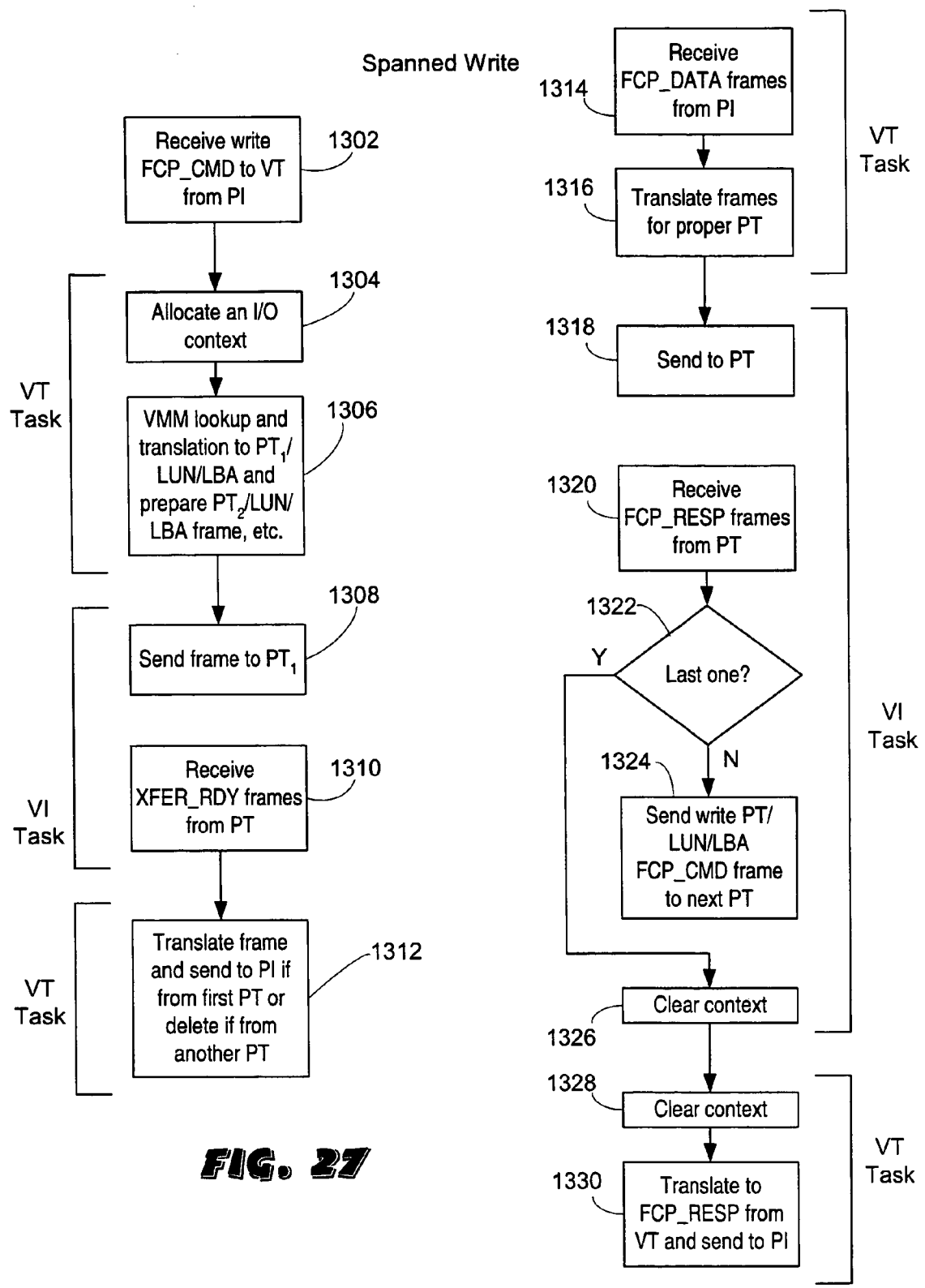
Figure 28:
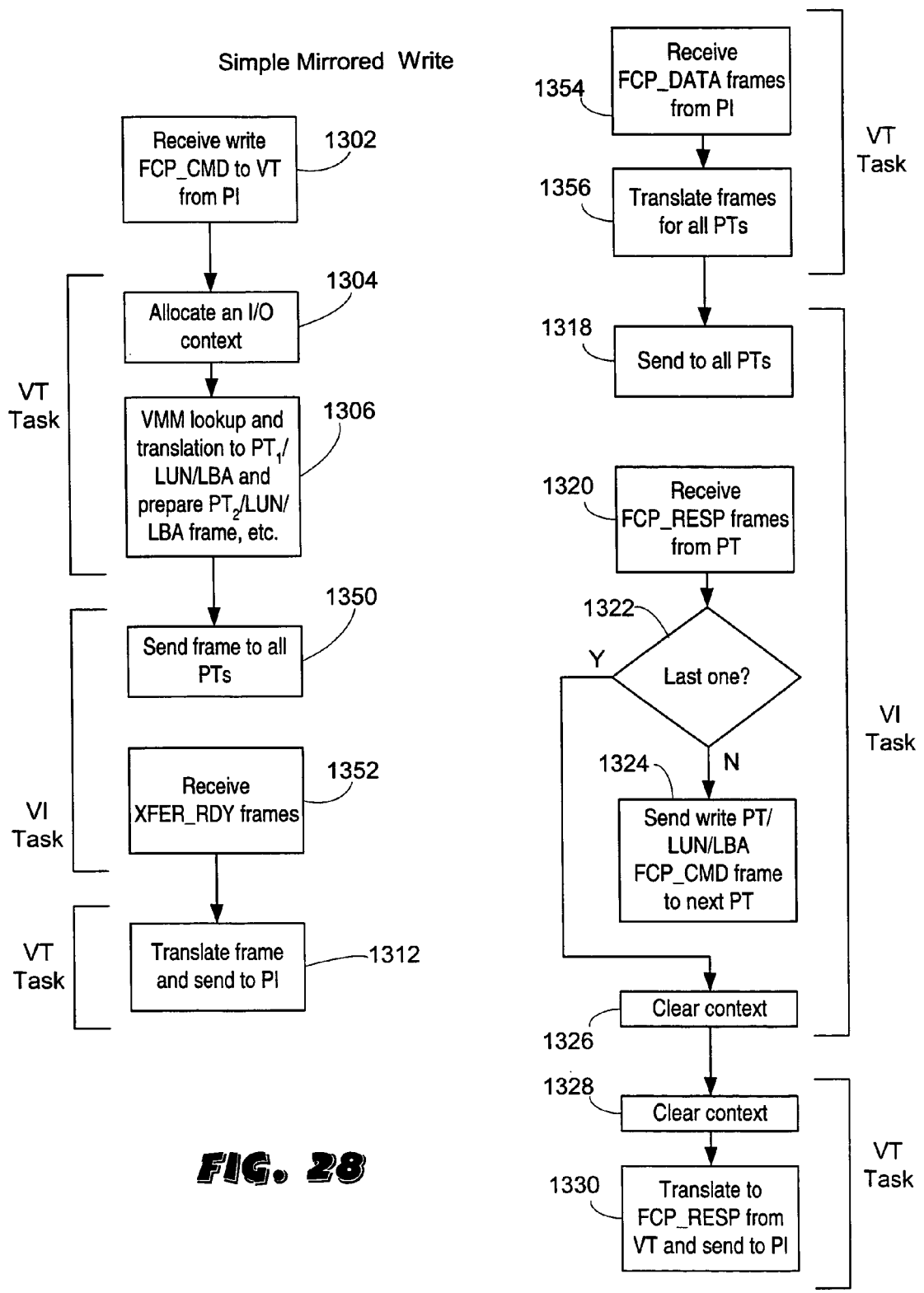

FIG. 27 illustrates the complementary spanned write operation. In step 1302 the write FCP_CMD frame directed to the virtual target is received from a physical initiator. In step 1304 the virtual target task allocates the I/O context and in step 1306 performs a VMM table lookup and translates the FCP_CMD frame into command frames to the series of physical targets, such as physical target one, physical target two, and so on. In step 1308 the virtual initiator task sends the FCP_CMD frame to physical target one. Then after some period of time in step 1310 the virtual initiator begins receiving a XFER_RDY frame. In step 1312 this frame is translated by the virtual target task and provided to the physical initiator if it is from the first physical target. If it is from another physical target, then the frame is simply deleted to conceal the virtual nature from the physical initiator. Sometime thereafter the physical initiator begins providing FCP_DATA frames and these are received by the virtual target task 1314. The virtual target task then translates these data frames based on the particular target being utilized in step 1316, waiting until a XFER_RDY frame has been received for physical targets beyond the first. In step 1318, the virtual initiator task provides these frames to the proper physical targets. Sometime later the virtual initiator receives an FCP_RESP from the physical target, indicating that this operation completes the physical target. In step 1322 the virtual initiator target determines that this is the FCP_RESP from the last of the physical targets in the series. If not, in step 1324 the virtual initiator sends the next write FCP_CMD frame to the next physical target. If it was the last response frame, then in step 1326 the virtual initiator task clears it contexts. In step 1328 the virtual target task clears its context and in step 1330 the virtual target test translates this response to indicate it is from the virtual target and sends it to the physical initiator, thus ending the spanned write sequence.

The next example is a simple mirrored write operation to a virtual target. This operation is very similar to a spanned write operation except that a few steps are changed. The first changed step is step 1350, where the command frames are simultaneously sent to all of the physical targets. Then in step 1352, the virtual initiator waits until all of the XFER_RDY frames are received from all of the physical targets prior to transferring the XFER_RDY frame to the virtual target task in step 1312. In step 1354 the virtual target task translates the FCP_DATA frame for all physical targets and then in step 1356 the virtual initiator task transmits them simultaneously to all of the physical targets.

Thus has been shown an architecture which splits data and control operations into fast and control paths, allowing data-related operations to occur at full wire speed, while providing full support for the necessary control operations. The full wire speed operation is achieved, at least in part, due to the presence of multiple embedded processors at each port. Devices according to the architecture can handle normal Fibre Channel and IP protocols, allowing use in FC and iSCSI SANs, or the development of a mixed environment. Further, devices according to the architecture can handle numerous storage processing applications, where the storage processing is performed in the fabric, simplifying the design and operation of the various network nodes. Explanations and code flow using the architecture are provided for snapshotting, journaling, mirroring, migration and virtualization. Other storage processing applications can readily be performed on devices according to the architecture.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A storage processing device comprising:
an input/output module for coupling to first and second storage units, said input/output module including processors to receive, operate on and transmit network traffic; and
a control module coupled to said input/output module, said input/output module and said control module being configured to interactively perform data migration from the first storage unit to the second storage unit,
wherein said processors delay a data write operation if said data write operation interferes with an ongoing data migration, said delay occurring by said processors holding said data write operation and then completing said data write operation without intervention of said control module.

2. The storage processing device of claim 1, wherein said processors include table information related to data migration and wherein said control module is coupled to said table information to maintain said table information for data migration.

3. The storage processing device of claim 2, wherein said table information includes a barrier entry and said processors delay data write operations if said barrier entry relates to said data write operation.

4. The storage processing device of claim 2, wherein said table information includes an entry related to the extents in the data migration, said entry defining an extent operation type.

5. The storage processing device of claim 4, wherein said table information further includes a legend entry for each extent operation type defining migration operations for the extent.

6. The storage processing device of claim 5, wherein said table information further includes entries referenced by said legend entry defining physical extent location.

7. The storage processing device of claim 6, wherein legend entries include entries indicating data not migrated, data migrated and a barrier entry for data being migrated.

8. The storage processing device of claim 7, wherein said processors delay data write operations if said barrier entry relates to said data write operation.

9. The storage processing device of claim 8, wherein said control module provides commands to copy data and places said barrier entry for said data being copied.

10. A network comprising:
at least one host adapted to be connected to a switched fabric;
at least two storage units, each adapted to be connected to a switched fabric; and
a switched fabric connected to and coupling the at least one host and the at least two storage units, the switched fabric comprising:
a storage processing device coupled to the at least one host and first and second storage units of the at least two storage units, the storage processing device including:
an input/output module including processors to receive, operate on and transmit network traffic; and
a control module coupled to said input/output module, said input/output module and said control module being configured to interactively perform data migration between the first and second storage units,
wherein said processors delay a data write operation if said data write operation interferes with an ongoing data migration, said delay occurring by said processors holding said data write operation and then completing said data write operation without intervention of said control module.

11. The network of claim 10, wherein said processors include table information related to data migration and wherein said control module is coupled to said table information to maintain said table information for data migration.

12. The network of claim 11, wherein said table information includes a barrier entry and said processors delay data write operations if said barrier entry relates to said data write operation.

13. The network of claim 11, wherein said table information includes an entry related to the extents in the data migration, said entry defining an extent operation type.

14. The network of claim 13, wherein said table information further includes a legend entry for each extent operation type defining migration operations for the extent.

15. The network of claim 14, wherein said table information further includes entries referenced by said legend entry defining physical extent location.

16. The network of claim 15, wherein legend entries include entries indicating data not migrated, data migrated and a barrier entry for data being migrated.

17. The network of claim 16, wherein said processors delay data write operations if said barrier entry relates to said data write operation.

18. The network of claim 17, wherein said control module provides commands to copy data and places said barrier entry for said data being copied.

19. A method in a storage processing device comprising:
providing an input/output module including processors receiving, operating on and transmitting network traffic; and
providing a control module coupled to said input/output module, said input/output module and said control module being configured to interactively perform data migration between the first and second storage units whether the first and second storage units are directly connected to the storage processing device or are coupled through the at least one switch
wherein the processors delay a data write operation if said data write operation interferes with an ongoing data migration, said delay occurring by the processors holding said data write operation and then completing said data write operation without intervention of said control module.

20. The method of claim 19, wherein said processors include table information related to data migration and wherein said control module is coupled to said table information to maintain said table information for data migration.

21. The method of claim 20, wherein said table information includes a barrier entry and said processors delay data write operations if said barrier entry relates to said data write operation.

22. The method of claim 20, wherein said table information includes an entry related to the extents in the data migration, said entry defining an extent operation type.

23. The method of claim 22, wherein said table information further includes a legend entry for each extent operation type defining migration operations for the extent.

24. The method of claim 23, wherein said table information further includes entries referenced by said legend entry defining physical extent location.

25. The method of claim 24, wherein legend entries include entries indicating data not migrated, data migrated and a barrier entry for data being migrated.

26. The method of claim 25, wherein said processors delay data write operations if said barrier entry relates to said data write operation.

27. The method of claim 26, wherein said control module provides commands to copy data and places said barrier entry for said data being copied.

28. A network device comprising:
a fast path module for coupling to first and second storage units, said fast path module including a plurality of processors for receiving, operating on and transmitting network traffic; and
a control path module coupled to said fast path module, said control module and said fast path module cooperating to interactively perform data migration from the first storage unit to the second storage unit,
wherein said plurality of processors delay a write operation if said write operation interferes with an ongoing data migration, said delay occurring by said plurality of processors holding said data write operation and then completing said data write operation without intervention of said control module.

29. The network device of claim 28, wherein said processors include table information related to data migration and wherein said control module is coupled to said table information to maintain said table information for data migration.

30. The network device of claim 29, wherein said table information includes a barrier entry and said processors delay data write operations if said barrier entry relates to said data write operation.

31. The network device of claim 29, wherein said table information includes an entry related to the extents in the data migration, said entry defining an extent operation type.

32. The network device of claim 31, wherein said table information further includes a legend entry for each extent operation type defining migration operations for the extent.

33. The network device of claim 32, wherein said table information further includes entries referenced by said legend entry defining physical extent location.

34. The network device of claim 33, wherein legend entries include entries indicating data not migrated, data migrated and a barrier entry for data being migrated.

35. The network device of claim 34, wherein said processors delay data write operations if said barrier entry relates to said data write operation.

36. The network device of claim 35, wherein said control module provides commands to copy data and places said barrier entry for said data being copied.

* * * * *